(12) United States Patent
Shuai et al.

(10) Patent No.: US 10,661,257 B2
(45) Date of Patent: May 26, 2020

(54) DOPED GRAPHITIC CARBON NITRIDES, METHODS OF MAKING AND USES OF THE SAME

(71) Applicant: The George Washington University, Washington, DC (US)

(72) Inventors: Danmeng Shuai, Herndon, VA (US); Qinmin Zheng, Arlington, VA (US)

(73) Assignee: The George Washington University, Washington, DC (US)

( * ) Notice: Subject to any disclaimer, the term of this patent is extended or adjusted under 35 U.S.C. 154(b) by 583 days.

(21) Appl. No.: 15/434,959

(22) Filed: Feb. 16, 2017

(65) Prior Publication Data

US 2017/0232427 A1 Aug. 17, 2017

Related U.S. Application Data

(60) Provisional application No. 62/295,624, filed on Feb. 16, 2016.

(51) Int. Cl.
*B01J 27/24* (2006.01)
*B01J 21/18* (2006.01)
(Continued)

(52) U.S. Cl.
CPC .............. *B01J 27/24* (2013.01); *B01J 21/18* (2013.01); *B01J 27/14* (2013.01); *B01J 35/004* (2013.01); *B01J 37/084* (2013.01); *C02F 1/32* (2013.01); *C02F 1/725* (2013.01); *C09D 5/14* (2013.01); *C02F 2101/305* (2013.01); *C02F 2101/306* (2013.01); *C02F 2305/10* (2013.01); *Y02W 10/37* (2015.05)

(58) Field of Classification Search
CPC ... B01J 27/24; B01J 21/18; B01J 27/14; B01J 35/00; B01J 35/02; B01J 37/04; B01J 37/08; C02F 1/32; C02F 1/74

See application file for complete search history.

(56) References Cited

U.S. PATENT DOCUMENTS

2012/0292177 A1* 11/2012 Thulin ..................... B01J 27/24
204/157.52

OTHER PUBLICATIONS

Shalom: Formation of Heterojunctions in Modified Graphitic Carbon Nitride: Synthesis and Noble (Year: 2014).*

(Continued)

*Primary Examiner* — Cameron J Allen
(74) *Attorney, Agent, or Firm* — Blank Rome LLP

(57) ABSTRACT

Carbon-doped graphitic carbon nitride (g-$C_3N_4$) compositions are synthesized from the chemical precursors melamine, cyanuric acid and barbituric acid. Phosphorus-doped g-$C_3N_4$ compositions are synthesized from the chemical precursors melamine, cyanuric acid and etidronic acid. Carbon- and phosphorus-doped g-$C_3N_4$ compositions, when in the presence of UV or visible light, can be used in water treatment systems to photocatalytically degrade persistent organic micropollutants such as pharmaceuticals and personal care products (PPCPs), endocrine disrupting compounds (EDCs), pesticides, and herbicides. Carbon- and phosphorus-doped g-$C_3N_4$ compositions can also be applied to surfaces of household and public items to kill protozoa, eukaryotic parasites, algal pathogens, bacteria, fungi, prions, viruses, or other microorganisms, preventing the transfer thereof between users.

11 Claims, 23 Drawing Sheets

(51) Int. Cl.
  B01J 27/14    (2006.01)
  B01J 35/00    (2006.01)
  B01J 37/08    (2006.01)
  C09D 5/14     (2006.01)
  C02F 1/32     (2006.01)
  C02F 1/72     (2006.01)
  C02F 101/30   (2006.01)

(56) References Cited

OTHER PUBLICATIONS

Carbon Self-Doping Induced Activation of n—p* Electronic Transitions of g-C3N4 Nanosheets for Efficient Photocatalytic H2 Evolution Feng-Yun Su, Cheng-Qun Xu, Yu-Xiang Yu, and Wei-De Zhang* (Year: 2016).*

M. Borisover, et al., "Enhancement Effect of Water Associated with Natural Organic Matter (NOM) on Organic Compound-NOM Interactions: A Case Study with Carbamazepine", ScienceDirect; www.elsevier.com/locate/chemosphere; Chemosphere 82 (2011). pp. 1454-1460.

D. A. Newcombe, et al., "Bioremediation of Atrazine-Contaminated Soil by Repeated Applications of Atrazine-Degrading Bacteria", Appl. Microbiol Biotechnol; (1999); 51; pp. 877-882.

J. Araña, et al., "Photocatalytic Degradation of Phenolic Compounds with New $TiO_2$ Catalysts", ScienceDirect www.elsevier.com/locate/apcatb; Applied Catalysis B: Environmental 100; (2010); pp. 346-354.

M. J. Nalbandian et al., "Tailored Synthesis of Photoactive $TiO_2$ Nanofibers and Au/$TiO_2$ Nanofiber Composites: Structure and Reactivity Optimization for Water Treatment Applications", Environmental Science & Technology; American Chemical Society; 2015; 49, pp. 1654-1663.

\* cited by examiner

US 10,661,257 B2

DOPED GRAPHITIC CARBON NITRIDES, METHODS OF MAKING AND USES OF THE SAME

CROSS-REFERENCE TO RELATED APPLICATIONS

This application claims the benefit of U.S. provisional application No. 62/295,624, filed Feb. 16, 2016, the contents of which are incorporated by reference herein in its entirety.

FIELD OF TECHNOLOGY

The present application relates doped graphitic carbon nitride (g-$C_3N_4$) compositions and methods of making such compositions. The present application also relates to the use of doped g-$C_3N_4$ compositions in water treatment and antimicrobial applications.

BACKGROUND

A growing number of persistent organic micropollutants such as pharmaceuticals and personal care products (PPCPs), endocrine disrupting compounds (EDCs), pesticides, and herbicides are frequently observed in natural and treated water. These contaminants are recalcitrant to conventional water and wastewater treatment and may pose risks to human and ecological systems even at very low concentrations. Persistent and emerging waterborne, foodborne, and airborne pathogens can cause the spread of infectious diseases, and their control is important to protect the public health. Photocatalysis is a promising advanced oxidation process (AOP) for the degradation or mineralization of persistent organic micropollutants and the inactivation of pathogens because it activates $O_2$ and/or $H_2O$ at ambient conditions to generate reactive oxygen species (ROS; e.g., .OH, $O_2^-$./$HO_2$., $H_2O_2$, and $^1O_2$) in situ. Photocatalysis also eliminates the hurdles in the storage, handling, and transportation of oxidants or disinfectants, and potentially uses renewable solar energy or indoor lighting for water purification and antimicrobial applications.

Recently, graphitic carbon nitride (g-$C_3N_4$) has emerged as a visible-light-responsive photocatalyst with tunable band gaps of 1.8-2.7 eV that allow the harvesting of visible light up to 460-698 nm (potentially utilizing 13-49% of solar energy, though photocatalytic activity may be reduced at a longer wavelength). g-$C_3N_4$ is made from earth-abundant, inexpensive carbon and nitrogen containing precursors (e.g., urea and melamine), is biocompatible with no reported toxicity, is resistant to photo-corrosion, and remains chemically stable in harsh environments.

Supramolecular preassembly of triazine precursors has become an attractive approach to tailor the properties and reactivity of g-$C_3N_4$. The supramolecular approach is more environmentally benign and sustainable compared to widely used hard-templating with nanosilica because no toxic or corrosive chemicals are involved (e.g., HF or $NH_4HF_2$ for the post-removal of silica and pore generation). Cyanuric acid has been applied with melamine because they can interact with each other by forming hydrogen bonds, producing a highly stable supramolecule as the precursor of g-$C_3N_4$. Cyanuric acid is less thermally stable than melamine and decomposes into gases at an elevated temperature, which may create a porous structure of g-$C_3N_4$ with an increased surface area and charge separation.

The molecular structure of g-$C_3N_4$ has also been altered with metal and/or nonmetal dopants, or nanoparticles to improve charge separation and visible-light utilization. Such methodologies are disadvantageous, however, because metal dopants or nanoparticles are more expensive (e.g., noble metal loading) and may leach or be deactivated in a complex environment.

BRIEF SUMMARY OF THE DRAWINGS

The accompanying figures illustrate embodiments and serve to explain principles of the disclosed embodiments. It is to be understood, however, that these figures are presented for purposes of illustration only, and not for defining limits of the present invention.

DETAILED DESCRIPTION

Figure 1:
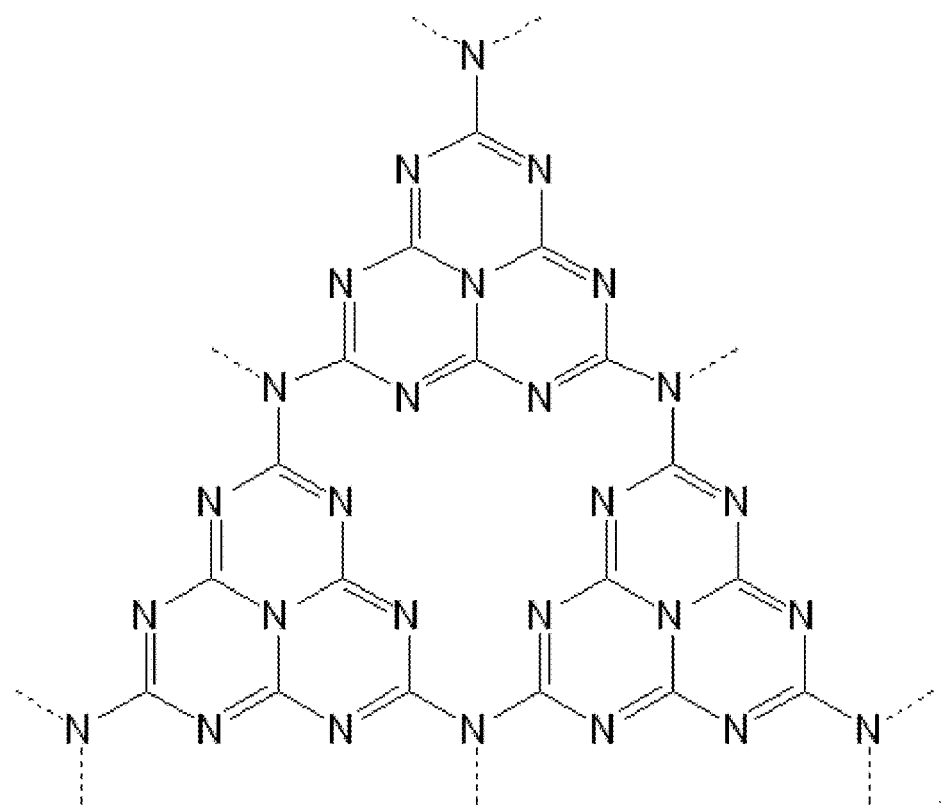
FIG. 1 is an illustration of the chemical structure of a portion of a graphitic carbon nitride (g-$C_3N_4$) sheet in accordance with various embodiments of the present disclosure.

Exemplary, non-limiting embodiments of the present application will now be described with references to the above-mentioned figures. Particularly, embodiments of the application comprise parts or method steps that are similar or identical to each other. These parts or method steps are thus denoted with similar or identical names or reference numerals. Description of these relevant parts of method steps is hereby incorporated by reference, wherever relevant or appropriate.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

For the purposes of this specification and appended claims, the term "coupled" refers to the linking or connection of two objects. The coupling can be permanent or reversible. The coupling can be direct or indirect. An indirect coupling includes connecting two objects through one or more intermediary objects. The term "substantially" refers to an element essentially conforming to the particular dimension, shape or other word that substantially modifies, such that the component need not be exact. For example, substantially cylindrical means that the object resembles a cylinder, but can have one or more deviations from a true cylinder.

FIG. 1 is an illustration of the chemical structure of graphitic carbon nitride (g-$C_3N_4$). g-$C_3N_4$ as shown in FIG. 1 can be synthesized by, for example, heating a powder of any of urea, melamine, dicyandiamide, or thiourea at elevated temperatures for a predetermined period of time, followed by cooling to room temperature. g-$C_3N_4$ is in the form of a two-dimensional sheet and characterized by tri-s-triazine ($C_6N_7$) units, as elementary building blocks, and a pore bounded by three tri-s-triazine units. In some instances, g-$C_3N_4$ can also be formed from a mixture of melamine and cyanuric acid.

Figure 2:
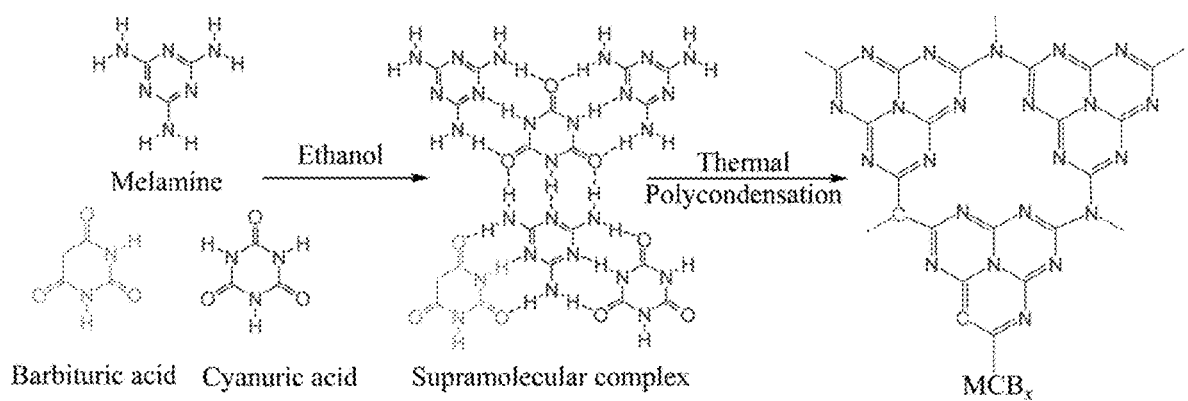
FIG. 2 is an illustration of a synthetic procedure for the formation of supramolecule-based, carbon-doped g-$C_3N_4$ ($MCB_x$) compositions in accordance with various embodiments of the present disclosure.

According to various aspect of the present disclosure, carbon (C)-doped supramolecule-based g-$C_3N_4$ ($MCB_x$) compositions, described herein, can be used to degrade and/or decompose persistent organic micropollutants such as PPCPs, EDCs, pesticides, and herbicides that are frequently observed in natural and treated water. Generally, $MCB_x$ compositions can be made by formation of a supramolecular complex from predetermined amounts of the precursors melamine, cyanuric acid, and barbituric acid, followed by thermal polycondensation, as illustrated in FIG. 2. To synthesize $MCB_x$ compositions, the following general methodology can be utilized. First, predetermined amounts of melamine, cyanuric acid, and barbituric acid are dispersed in a solvent to form a suspension. The solvent can be, for example, an alcohol such as methanol or ethanol, water, chlorinated solvents such as chloroform or methylene chloride, acetone, an ether such as diethyl or diphenyl ether, and aldehyde, a ketone, any combination thereof, or any other suitable solvent or solvent system. The suspension can then be stirred and agitated for a period of time suitable for the suspension to become substantially homogeneous. Agitation can be, for example, shaking, ultrasonication in a bath or using a probe, or any other suitable agitation process known to one of ordinary skill in the art. The substantially homogeneous suspension can then be subjected to elevated temperature to remove the solvent and to form the supramolecular complex. The dried supramolecular complex can then be placed in a chemically and thermally inert container, such as an alumina or ceramic crucible, and heated to a temperature sufficient to form the final $MCB_x$ composition. The temperature used for formation of the final $MCB_x$ composition can range from about 450° C. to about 600° C., alternatively about 500° C. to about 600° C., and alternatively about 550° C.

$MCB_x$ compositions can be synthesized from a precursor mixture comprising about 50 wt % melamine, about 2.5-49.75 wt % cyanuric acid, and about 0.25-47.5 wt % barbituric acid. For example, preparation of $MCB_x$ on a four gram scale can utilize 2 grams of melamine, 0.1 to 1.99 grams of cyanuric acid and 0.01 to 1.9 grams of barbituric acid. In some instances, on a four gram scale, 0.01 to 0.1 grams of barbituric acid is used. As described herein, a $MCB_x$ composition formed from, for example, 2 grams of melamine, 1.93 grams of cyanuric acid, and 0.07 grams of barbituric acid is named as "$MCB_{0.07}$." One of ordinary skill in the art can readily appreciate that more or less $MCB_x$ can be produced by scaling the above described values.

The addition of barbituric acid to melamine and cyanuric acid can lead to C-doped g-$C_3N_4$ compositions via substitution of one or more nitrogen atoms within a tri-s-triazine unit, or via substitution of nitrogen atoms linking tri-s-triazine units together, with a carbon atom (FIG. 2). $MCB_x$ compositions according to the present disclosure are substantially mesoporous (i.e. having pores with diameters ranging from about 2 to 50 nm) with surface areas ranging from about 70 $m^2$/g to about 100 $m^2$/g. $MCB_x$ compositions according to the present disclosure may also have pore volumes ranging from about 0.5 $cm^3$/g to about 0.8 $cm^3$/g. $MCB_x$ compositions according to the present disclosure may also have carbon to nitrogen (C/N) mass ratios ranging from about 0.60 to about 0.70.

Figure 3:
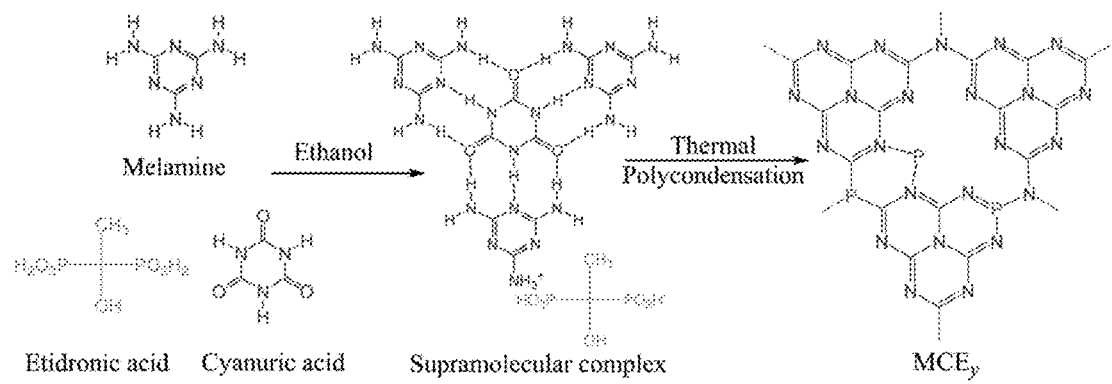
FIG. 3 is an illustration of a synthetic procedure for the formation of supramolecule-based, phosphorus-doped g-$C_3N_4$ ($MCE_y$) compositions in accordance with various embodiments of the present disclosure.

According to various aspects of the present disclosure, phosphorus (P)-doped supramolecule-based g-$C_3N_4$ ($MCE_y$) compositions, described herein, can be used to degrade and/or decompose persistent organic micropollutants such as PPCPs, EDCs, pesticides, and herbicides that are frequently observed in natural and treated water. Generally, $MCE_y$ compositions can be made by formation of a supramolecular complex from predetermined amounts of the precursors melamine, cyanuric acid, and etidronic acid, followed by thermal polycondensation, as illustrated in FIG. 3. To synthesize $MCE_y$ compositions, the following general methodology can be utilized. First, predetermined amounts of melamine, cyanuric acid, and etidronic acid are dispersed in a solvent to form a suspension. The solvent can be, for example, an alcohol such as methanol or ethanol, water, chlorinated solvents such as chloroform or methylene chloride, acetone, an ether such as diethyl or diphenyl ether, and aldehyde, a ketone, any combination thereof, or any other suitable solvent or solvent system. The suspension can then be stirred and agitated for a period of time suitable for the suspension to become substantially homogeneous. Agitation can be, for example, shaking, ultrasonication in a bath or using a probe, or any other suitable agitation process known to one of ordinary skill in the art. The substantially homogeneous suspension can then be subjected to elevated temperature to remove the solvent and to form the supramolecular complex. The dried supramolecular complex can then be placed in a chemically and thermally inert container, such as an alumina or ceramic crucible, and heated to a temperature sufficient to form the final $MCE_y$ composition. The temperature used for formation of the final $MCE_y$ composition can range from about 450° C. to about 600° C., alternatively about 500° C. to about 600° C., and alternatively about 550° C.

$MCE_y$ compositions can be synthesized from a precursor mixture comprising about 50 wt % melamine, about 37.5-49.75 wt % cyanuric acid, and about 0.25-12.5 wt % etidronic acid. For example, preparation of $MCE_y$ on a four gram scale can utilize 2 grams of melamine, 1.5 to 1.99 grams of cyanuric acid and 0.01 to 0.5 grams of etidronic acid. In some instances, on a four gram scale, 0.01 to 0.1 grams of etidronic acid is used. As described herein, a $MCE_y$ composition formed from, for example, 2 grams of melamine, 1.97 grams of cyanuric acid, and 0.03 grams of etidronic acid is named as "$MCE_{0.03}$." One of ordinary skill in the art can readily appreciate that more or less $MCE_y$ can be produced by scaling the above described values.

The addition of etidronic acid to melamine and cyanuric acid can lead to P-doped $g$-$C_3N_4$ compositions via substitution of one or more nitrogen or carbon atoms within a tri-s-triazine unit, and/or via substitution of nitrogen atoms linking tri-s-triazine units together with a phosphorus atom. In some instances, the addition of etidronic acid to melamine and cyanuric acid can lead to P-doped $g$-$C_3N_4$ compositions wherein phosphorus atoms chelate in a bidentate fashion to nitrogen atoms oriented toward the pore (FIG. 3). $MCE_y$ compositions according to the present disclosure are substantially mesoporous (i.e. having pores with diameters ranging from about 2 to 50 nm) with surface areas ranging from about 70 $m^2/g$ to about 100 $m^2/g$. $MCE_y$ compositions according to the present disclosure may also have pore volumes ranging from about 0.5 $cm^3/g$ to about 0.8 $cm^3/g$.

In some instances, computational quantum mechanical modelling methods such as, but not limited to density functional theory (DFT), time-dependent density functional theory (TDDFT), chemical or molecular dynamics, semi-empirical and empirical methods, and ab initio methods can be used to rationally design $MCB_x$ and $MCE_y$ compositions to have thermodynamically stable structures, suitable charge separation, and suitable energy levels of conduction and valence bands to promote photocatalytic oxidation.

In some instances, the presently described $MCB_x$ and $MCE_y$ compositions can be used in the presence of ultraviolet (UV) or visible light as a photocatalyst in water treatment applications. Specifically, $MCB_x$ and $MCE_y$ compositions can be used to degrade persistent organic micropollutants such as PPCPs, EDCs, pesticides, and herbicides which are frequently observed in natural and treated water. In general, the target pollutants can be anything that degrades or decomposes in the presence of ROS (e.g., —OH, $O_2^-$/$HO_2$·, $H_2O_2$, and $^1O_2$) in situ. In the present disclosure, phenol, atrazine, sulfamethoxazole, and carbamazepine are discussed as target pollutants/contaminants. One of ordinary skill in the art, however, can readily appreciate that $MCB_x$ and $MCE_y$ compositions can be used to degrade or decompose target pollutants/contaminants having chemical structures similar to such compounds.

In some instances, $MCB_x$ and $MCE_y$ compositions can be used to degrade aliphatic or aromatic hydrocarbons. In other instances, $MCB_x$ and $MCE_y$ compositions can be used to degrade aliphatic or aromatic alcohols. In yet other instances, $MCB_x$ and $MCE_y$ compositions can be used to degrade substituted or unsubstituted triazines. In yet other instances, $MCB_x$ and $MCE_y$ compositions can be used to degrade substituted or unsubstituted oxazoles or oxazodines. In yet other instances, $MCB_x$ and $MCE_y$ compositions can be used to degrade substituted or unsubstituted pyrroles, pyridines, purines, and pyrimidines. In yet other instances, $MCB_x$ and $MCE_y$ compositions can be used to degrade substituted or unsubstituted azepines. In yet other instances, $MCB_x$ and $MCE_y$ compositions can be used to degrade aldehydes, ketones, esters and carboxylic acids. In yet other instances, $MCB_x$ and $MCE_y$ compositions can be used to degrade amines, imines, amides, and sulfonamides. While specific examples of compounds which can be degraded by $MCB_x$ and $MCE_y$ compositions are provided above, one of ordinary skill in the art can readily appreciate that the $MCB_x$ and $MCE_y$ compositions disclosed herein can be used to degrade any compounds which are reactive to ROS (e.g., .OH, $O_2^-$/$HO_2$·, $H_2O_2$, and $^1O_2$).

In some instances, where a $MCB_x$ or $MCE_y$ composition is used as a photocatalyst in water treatment applications, the $MCB_x$ or $MCE_y$ composition can be formed into any one of a bulk powder, a porous brick or sponge-like material, a wafer, a film, or any other suitable shape. The shaped $MCB_x$ or $MCE_y$ composition can be placed in a cartridge, piping, or similar containment means. The cartridge or similar containment means can have a fluid inlet for entry of contaminated water or fluid therein and a fluid outlet for the water or fluid to exit after degradation of the contaminant(s) by the $MCB_x$ or $MCE_y$ composition. The cartridge, piping or similar containment means should be transparent or substantially transparent to allow for the passage or UV or visible light to pass therethrough. In some instances, thin films, sheets wafers or coupons can be formed by subjecting a bulk powder of a $MCB_x$ or $MCE_y$ composition, or a combination of $MCB_x$ and $MCE_y$ compositions, to high pressure, such as a hydraulic or pneumatic press. In other instances, a bulk powder of a $MCB_x$ or $MCE_y$ composition, or a combination of $MCB_x$ and $MCE_y$ compositions, can be formed into a shaped porous brick or sponge-like material using a tablet press or similar device. The tablet press or similar device can have any suitable dimensions to make shaped porous bricks or sponge-like materials having dimensions for small to industrial scale water treatment applications.

Figure 4:
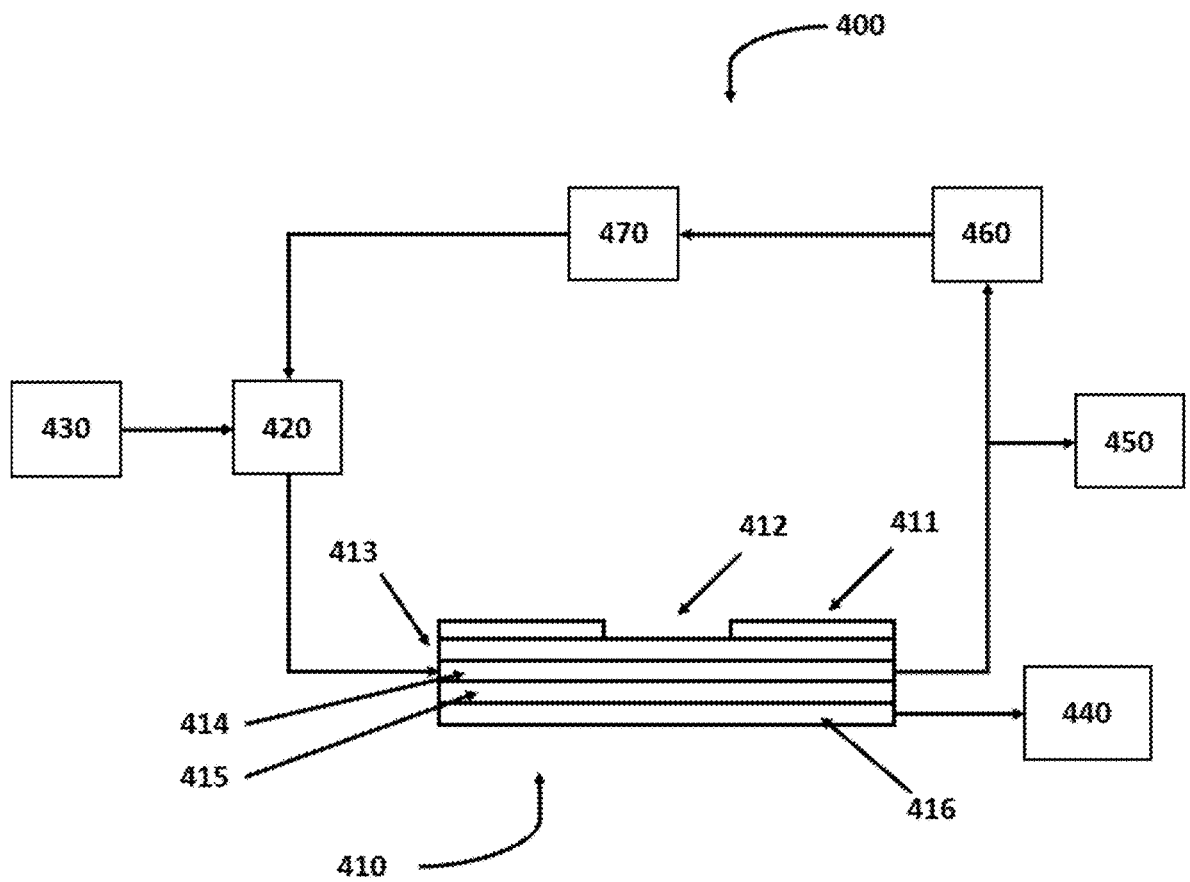
FIG. 4 is a block diagram of an exemplary water treatment system according to various aspects of the present disclosure.

FIG. 4 is a block diagram of an exemplary water treatment system according to various aspects of the present disclosure. The water treatment system 400 includes a water purification assembly 410 and a contaminated water source 420. The water purification assembly 410 includes a top surface 411, a transparent plate 413, a contaminated water stream 414 having a contaminated water inlet (not shown) and a concentrated contaminated water outlet (not shown), a membrane 415 including a $MCB_x$ composition and/or a $MCE_y$ composition, and purified water stream 416 having a purified water outlet (not shown). The top surface 411 includes an aperture 412 for the transmission of UV or visible light therethrough to irradiate the $MCB_x$ composition and/or $MCE_y$ composition-containing membrane 415 for the production of ROS. Contaminated water is transmitted from the contaminated water source 420 to the contaminated water stream 414, is purified by the membrane 415, and then enters the purified water stream 416. A pressurized gas source 430 is fluidically coupled with the contaminated water source 420 to assist in transmission of the contaminated water from the contaminated water source 420 to the contaminated water stream 414. The purified water outlet of the purified water stream 416 is fluidically coupled with an inlet (not shown) of a purified water container 440. The remaining contaminated water, now concentrated, is transmitted from the contaminated water stream 414, through the concentrated contaminated water outlet, to an inlet (not shown) of a water bath cooler 470 with the aid of a pump 460. The contaminated water may then re-enter the contaminated water source 420 from the water bath cooler 470, for further purification. A pressure vent valve 450 may be disposed between the contaminated water stream 414 and the pump 460. While the water treatment system 400 of FIG. 4 includes numerous components, one of ordinary skill in the art can readily appreciate that other components can be added to the water treatment system 400 without imparting from the scope of the present disclosure.

In some instances, the presently described $MCB_x$ and $MCE_y$ compositions can be used in the presence of UV or visible light as a photocatalyst in antimicrobial applications. Specifically, $MCB_x$ and $MCE_y$ compositions can be used to inactivate protozoa, eukaryotic parasites, algal pathogens, bacteria, fungi, prions, viruses, or other microorganisms which are frequently observed in water, air, food, or on any surfaces. In general, $MCB_x$ and $MCE_y$ compositions can be used against any protozoa, eukaryotic parasites, algal pathogens, bacteria, fungi, prions, viruses, or other microorganism that inactivates, degrades or decomposes in the presence of ROS (e.g., .OH, $O_2^-$/$HO_2$., $H_2O_2$, and $^1O_2$) in situ.

To inactivate protozoa, eukaryotic parasites, algal pathogens, bacteria, fungi, prions, viruses or other microorganisms, compositions comprising $MCB_x$ and/or $MCE_y$ compositions can be applied to any surface based on desired use. For instance, compositions comprising $MCB_x$ and/or $MCE_y$ compositions can be applied to surfaces, including portions gripped by a hand of a user, of kitchen counter-tops, cutting boards, cabinet, drawer or appliance handles or knobs to degrade potentially dangerous bacteria or viruses which may be transferred thereon during the preparation of meals or foodstuffs. In other instances, compositions comprising $MCB_x$ and/or $MCE_y$ compositions can be applied to the surface of food processing machines and food packages. In other instances, compositions comprising $MCB_x$ and/or $MCE_y$ compositions can be applied to the surfaces of furniture such as, for example desks, tables, lighting fixtures (for example, lamps), and so on to degrade communicable viruses or bacteria that may be transferred thereon by users, preventing the spread of such communicable viruses or bacteria to other users. In yet other instances, compositions comprising $MCB_x$ and/or $MCE_y$ compositions can be applied to the surfaces of light or power switches. In yet other instances, the compositions comprising $MCB_x$ and/or $MCE_y$ compositions can be applied to surface of, or impregnated in, woven textiles such as, but not limited to, yarns, fabrics, articles of clothing, medical or laboratory garments, drapery, and so on. In yet other instances, compositions comprising $MCB_x$ and/or $MCE_y$ compositions can be applied to any surface of interest in hospitals, doctors' or dentists' offices, rehabilitation facilities, hospice care facilities, etc. where the chances of the spread of communicable viruses or bacteria is especially high.

In some instances, $MCB_x$ and $MCE_y$ compositions may be used to degrade or inactivate bacteria such as, but not limited to, E. coli, staphylococcal species such as S. epidermidis, S. haemolyticus and S. aureus, Legionella species such as Legionella pneumophila, Vibrio cholera, Campylobacter, Brucella, Clostridium perfringens, Listeria, Salmonella, and Shigella.

In some instances, $MCB_x$ and $MCE_y$ compositions may be used to degrade or inactivate viruses such as, but not limited to, norovirus, rotavirus, adenovirus, and strains of influenza.

In some instances, $MCB_x$ and $MCE_y$ compositions may be used to degrade or inactivate protozoa such as, but not limited to, Cryptosporidium parvum, Giardia lamblia, and Naegleria fowleri.

In some instances, $MCB_x$ and/or $MCE_y$ compositions can be applied to surfaces with the aid of an adhesive. In such instances, an adhesive layer can first be disposed on a surface of an article and a layer of a $MCB_x$ composition, a $MCE_y$ composition, or a combination thereof can be disposed on the adhesive layer. In some instances, the $MCB_x$ composition, the $MCE_y$ composition, or combination thereof can be disposed upon the adhesive layer as a bulk powder using a powder coating method, a spray coating method or any other suitable powder application method known to one of ordinary skill the art. In other instances, a $MCB_x$ composition, a $MCE_y$ composition, or a combination thereof can first be formed into a film or sheet as described above and the film or sheet can be applied on the adhesive layer using a roll-to-roll coating technique, a lamination technique such as heated roll lamination or cold roll lamination, or any other suitable film or sheet application technique known to one of ordinary skill in the art. Adhesives suitable for application of a $MCB_x$ composition, a $MCE_y$ composition, or a combination thereof to a surface of an article can include, but is not limited to epoxies, polyurethanes, polychloroprene, polyamides, polyimides, polyacrylates, natural rubbers, shellac, polyvinyl compounds (such as polyvinyl acetate, alcohol, butyral, chloride, etc.), polyethylene, polypropylene, or any other suitable adhesive known to one of ordinary skill in the art.

In other instances, $MCB_x$ and/or $MCE_y$ compositions can be dispersed in a solvent to form a $MCB_x$ and/or $MCE_y$ containing suspension. The suspension can then be applied to a surface of an article and subsequently dried. Such methods can be, but are not limited to, dip-coating spin-coating, slit-coating, drop-casting, doctor blading, and inkjet printing, or any other suitable suspension method known to one of ordinary skill in the art.

In some instances, other additives, such as binders, rheology modifiers, and the like, can be incorporated into the $MCB_x$ or $MCE_y$ solution to modify its coating properties. Any additives added, however, should be substantially transparent to allow for the passage of UV or visible light therethrough to prevent deleterious effects to the photocatalytic efficiency of the $MCB_x$ or $MCE_y$ compositions. Furthermore, any adhesive or additive(s) used should be non-reactive or substantially non-reactive in the presence of ROS to prevent the degradation of the adhesive or additive(s) and loss of the $MCB_x$ or $MCE_y$ compositions from the surface by, for example, delamination.

EXAMPLES

The following examples are intended to be illustrative only, and are not intended to be, nor should they be construed as, limiting in any way of the scope of the present disclosure.

I. Materials and Methods

Reagents

All chemicals were at least reagent grade and used as received. The synthesis of $g-C_3N_4$ involved urea (Sigma-Aldrich, 98%), melamine (Acros Organic, 99+%), cyanuric acid (Sigma-Aldrich, 98%), barbituric acid (Sigma-Aldrich, 99%), etidronic acid monohydrate (Sigma-Aldrich, 95+%), and ethanol (Sigma-Aldrich, 99.5%). A buffer solution of 1 mM potassium phosphate monobasic (Fisher Scientific, 99.3%) was adjusted to pH 7.3 and used in photocatalytic experiments. Phenol (Sigma-Aldrich, 99+%), atrazine (Sigma-Aldrich, 98.8%), carbamazepine (Sigma-Aldrich, 98+%), and sulfamethoxazole (Sigma-Aldrich, 99+%) were used as probe contaminants in photocatalytic studies. Potassium nitrate (Fisher Scientific, 99.9%), humic acid sodium salt (Sigma-Aldrich), magnesium chloride (Fisher Scientific, 99.4%), calcium chloride dihydrate (Fisher Scientific, 74.3%), and sodium hydrosulfide hydrate (Sigma-Aldrich, NaHS 60+%) were selected as representative natural water constituents or foulants for photocatalytic reactions. Ammonium oxalate (Sigma-Aldrich, 99+%), tert-butyl alcohol (Sigma-Aldrich, 99+%), superoxide dismutase (from bovine erythrocytes, Sigma-Aldrich, >3,000 units/mg of protein), catalase (from bovine liver, lyophilized powder, Sigma-Aldrich, 2,000-5,000 units/mg of protein), and L-histidine (Sigma-Aldrich, 99+%) were selected as scavengers for oxidative species in photocatalytic reactions. The eluents for high performance liquid chromatographic (HPLC) analyses of pollutants consisted of sodium acetate (Sigma-Aldrich, anhydrous), potassium phosphate monobasic (Fisher Scientific, 99.3%), acetonitrile (ACN) (Fisher Scientific, 99.9%), and methanol (Sigma-Aldrich, 99.9%). All solutions were prepared in ultrapure water (Millipore, Milli-Q, 18.2 MW cm).

Density Functional Theory (DFT) Simulations

Electronic structure calculations were conducted using DFT as implemented in the CP2K suite. An initial cell relaxation was performed with the Perdew-Burke-Ernzerhof (PBE) density functional, a moderately-sized double-zeta valence polarized (DZVP) basis set, and Goedecker-Teter-Hutter (GTH) pseudopotentials (grid cutoff of 300 Ry), in a hybrid Gaussian-plane wave (GPW) framework. This optimized cell geometry was then used to define subsequent relaxations for undoped and doped materials via the range-separated, hybrid Heyd-Scuseria-Ernzerhof 06 (HSE06) functional. Energy shifts due to solvation were quantified by performing a reference calculation on undoped g-$C_3N_4$ using an implicit model.

All structures with nitrogen site substitutions were assumed to be uncharged, while interstitially doped systems and those with dopants at carbon sites were assigned a charge of +1. The relative stability of each dopant family was determined by comparing geometries optimized using undoped g-$C_3N_4$ cell parameters, excluding the nitrogen to carbon substitutions which used the average of optimized cell parameters for that series of dopants.

Synthesis of g-$C_3N_4$, Carbon Doped g-$C_3N_4$, and Phosphorus-Doped g-$C_3N_4$ The conventional g-$C_3N_4$ samples were synthesized from urea (U) or melamine (M). 10 g of urea or melamine powder was put into an alumina crucible with a cover (not sealed), heated at a rate of 2.3° C./min and maintained at 550° C. for 4 h in a muffle furnace, and then cooled down naturally.

The supramolecule-based g-$C_3N_4$ samples without non-metal doping were synthesized from melamine and cyanuric acid (MC, mass ratio 1:1).

Carbon-doped, supramolecule-based g-$C_3N_4$ samples ($MCB_x$), were synthesized from melamine, cyanuric acid, and barbituric acid with different mass ratios (i.e., 2 g of melamine, (2-x) g of cyanuric acid, and x g of barbituric acid; x=0-1.9).

Phosphorus-doped, supramolecule-based g-$C_3N_4$ samples ($MCE_y$), were synthesized from melamine, cyanuric acid, and etidronic acid with different mass ratios (i.e., 2 g of melamine, (2-y) g of cyanuric acid, and y g of etidronic acid; y=0-0.5).

The synthetic procedure of the MC, $MCB_x$, and $MCE_y$ samples was as follows. Precursors were first dispersed in 40 mL of ethanol to form suspension. The suspension was next stirred at ambient temperature for 3 h, followed by sonication (Elamsonic P, 37 kHz, 100 W) at room temperature for an additional 3 h. The suspension was then dried on a hot plate at 70° C. until no obvious liquid was found, and white supramolecular aggregates were formed. Finally, the dried supramolecular aggregates were put into an alumina crucible with a cover (not sealed), heated at a rate of 2.3° C./min and maintained at 550° C. for 4 h in a muffle furnace, and cooled down naturally.

Characterization of g-$C_3N_4$ Carbon-Doped g-$C_3N_4$ and Phosphorus Doped g-$C_3N_4$ The crystal phase of g-$C_3N_4$ was determined by X-ray powder diffraction (XRD) analyses on a Rigaku Miniflex+ diffractometer with Cu Kα radiation.

Sample morphologies were characterized with a scanning electron microscope (SEM, JEOL 6700F) and a transmission electron microscope (TEM, Philips CM300 FEG). For SEM, g-$C_3N_4$ samples dispersed in ethanol were cast and dried on a sample stub, and SEM micrographs were collected at 10 kV with a secondary electron detector. For TEM, g-$C_3N_4$ samples dispersed in ethanol were also cast and dried on a Cu grid with a carbon support, and TEM images were collected at 300 kV. The elemental distribution of $MCE_y$ was characterized by SEM-energy dispersive spectroscopy (EDS) (SEM, TESCAN MIRA3 FEI; EDS, TEAM Octane SSD) at an accelerating voltage of 20 kV.

Surface properties were investigated by X-Ray photoelectron spectroscopy (XPS). A PHI 5600 system was used for analysis under UHV conditions (pressure <$10^{-8}$ Torr). An Mg Kα source (1253.6 eV) was utilized, and ejected photoelectrons were measured with a hemispherical energy analyzer operating at 58.7 eV constant pass-energy. Peak positions were referenced to C1s, 284.5 eV, and CasaXPS was used to determine chemical composition and atomic concentrations at the surface (up to ca. 10 nm).

Attenuated total reflectance-Fourier transform infrared spectroscopic (ATR-FTIR) spectra were collected using a Nicolet 6700 spectrometer from 4000-525 $cm^{-1}$ (32 scans at 4 $cm^{-1}$ resolution). Spectra were peak normalized by the C—N asymmetric stretch at 1231 $cm^{-1}$, a region present in every sample tested with relative invariant spectral intensity.

Brunauer-Emmitt-Teller (BET) surface area and porosity analyses were performed by $N_2$ adsorption/desorption using a Micromeritics Tri Star 3000. Isotherm adsorption data for $P_0/P$ was recorded from 0.06-0.989. The volume of micropores was determined by t-plot analysis and the volume of mesopores was determined by BJH analysis. Samples were degassed at 140° C. for 12 h under dynamic vacuum ($10^{-3}$ Torr) prior to analysis.

Bulk carbon, hydrogen, and nitrogen were analyzed on Model CE 440 CHN Analyzer. The capsule containing g-$C_3N_4$ samples was injected into a high temperature (1000° C.) furnace and combusted in pure $O_2$ under static conditions. To ensure the complete combustion, a dynamic burst of $O_2$ was added at the end of the combustion period. The resulting combustion product contained $CO_2$, $H_2O$, and $N_2/NO_x$, and it next passed over Cu to scrub excess $O_2$ and reduce $NO_x$ to $N_2$. After scrubbing, the gases entered a mixing volume chamber to ensure a homogenous mixture at constant temperature and pressure, and were detected by high-precision thermal conductivity detectors. An $H_2O$ trap and a $CO_2$ trap were used between the detectors, and the differential signal before and after the trap was proportional to the H$_2$O concentration and CO$_2$ concentration. Finally, N$_2$ was measured against a He reference.

Optical absorbance spectra of the photocatalysts and their band gap were determined by a Thermo Scientific Evolution 300 UV-vis spectrophotometer with a Praying Mantis diffuse reflectance infrared Fourier transform spectroscopy (DRIFTS) accessory. The absorbance of g-C$_3$N$_4$ samples irradiated by light over a wavelength scan from 200 to 800 nm was measured, and the value was then converted into reflectance by equation 1:

$$A = \log(1/R) \tag{1}$$

where A is the measured absorbance and R is the reflectance. The function α, representative of optical absorption, which is equivalent to adsorption coefficient divided by scattering coefficient for g-C$_3$N$_4$, was calculated from the Kubelka-Munk formula:

$$\alpha = (1-R)^2/2R \tag{2}$$

The band gap was obtained by extrapolating the linear portion of $(\alpha h v)^{1/2}$ versus photon-energy plots at $(\alpha h v)^{1/2}=0$, h is Planck's constant (4.14×10$^{-5}$ eV·s), v is the frequency of photons which can be obtained by dividing c, the speed of light (3.0×10$^8$ m/s) by λ, the photon's wavelength.

Photoluminescence (PL) spectra were obtained from a home-made apparatus based on a Thermo Nicolet *Nexus* 670 rapid scan FTIR spectrometer. The PL spectra of the samples were obtained using a 354 nm diode pumped solid state laser from Teem Photonics as excitation source. The intensity on the samples was 30 μW focused to a spot of 100 μm in diameter. The emitted fluorescence was focused to a 300 mm path length monochromator and collected by a thermoelectrically-cooled charge-coupled device (CCD) camera, both from Princeton Instruments. A long wavelength pass filter cutting at 420 nm was used to block the laser light into the monochromator.

Zeta potential and hydrodynamic diameter of g-C$_3$N$_4$ aqueous suspensions were determined using folded capillary cells (DTS 1061, Malvern) on a Zetasizer Nano ZS instrument (Malvern, ZEN3600). The temperature was maintained at 25° C., and the scattering angle was 173° from the incident laser beam.

Ultraviolet-visible (UV-vis) spectra of g-C$_3$N$_4$ aqueous suspension was obtained on a Thermo Scientific Evolution 201PC spectrophotometer. The absorption spectra of the catalyst suspension were measured in the region of 200 to 800 nm with at a resolution of 2 nm. The sample cell was a quartz cuvette (1 cm by 1 cm). The concentration of the prepared catalysts was 1 g/L in the aqueous solution, and the suspension was dispersed using a bath sonicator (100 W) for 10 min.

Light Source Description and Characterization

Figure 5:
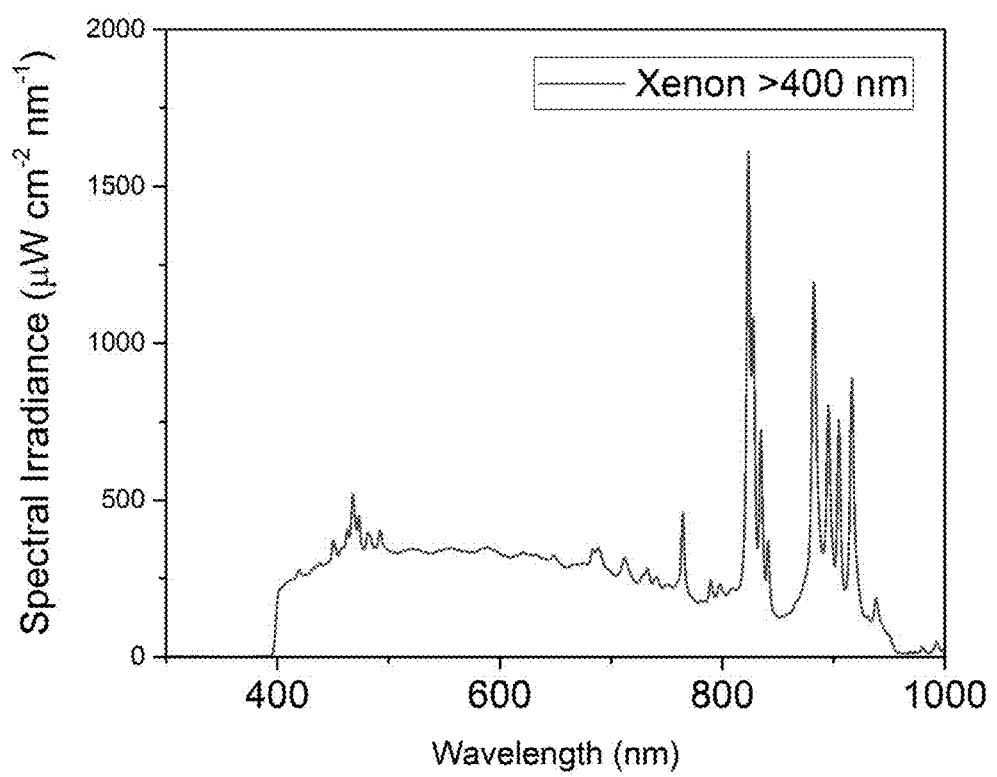
FIG. 5 is a graph displaying the spectral irradiance of a xenon lamp ($\lambda$>400 nm) for use in photocatalytic processes with g-$C_3N_4$ compositions in accordance with various embodiments of the present disclosure.

A xenon arc lamp (1000 W) was selected as a light source in the present Examples. A long-pass optical filter with a cut-off wavelength of 400 nm was used to simulate visible light irradiation at earth's surface. Spectral irradiance, photon fluence, and optical powder density of the xenon lamp were recorded by a spectroradiometer (AvaSpec ULS2048L). The spectral irradiance of the xenon lamp (λ>400 nm) was plotted in FIG. 5, and the photon fluence and the optical powder density were 601 (μmol of photons)/m$^2$ s and 16.7 mW/cm$^2$, respectively. Applicant notes that g-C$_3$N$_4$ with a band gap of 2.72 eV only absorbs photons with a wavelength up to about 460 nm.

Photocatalytic Activity Testing in a Phosphate Buffer

First, 15 mg of g-C$_3$N$_4$ was mixed with ultrapure water and dispersed via sonication (Elamsonic P, 37 kHz, 100 W) for 15 minutes. The dispersed g-C$_3$N$_4$ suspension and a probe pollutant (i.e., phenol, atrazine, carbamazepine, or sulfamethoxazole) were added to a phosphate buffer solution in a jacketed reactor, giving a total reaction volume of 15 mL, the g-C$_3$N$_4$ loading of 1 g/L, the phosphate buffer concentration of 1 mM (pH 7.3), and the pollutant concentration of 100 μM. The reactor had a diameter of 4 cm and starting depth of suspension of 1.5 cm. The surface of the suspension was centered 20 cm below the xenon lamp, which had a beam width of 6 cm. The reaction temperature was maintained at 25° C. The suspension was stirred for 20 minutes in the dark in order to ensure suspension homogeneity, and a sample of 300 μL was next taken to quantify the initial pollutant concentration. Pollutant adsorption onto g-C$_3$N$_4$ was negligible, based on the comparison of the measured initial concentration with the concentration in control reactors in absence of g-C$_3$N$_4$. The reactor was then irradiated under the xenon lamp (λ>400 nm, typically for 60 minutes), during which aqueous aliquots were withdrawn periodically. The aliquots were next centrifuged at 13,000 rpm for 1 hour in the dark to allow the particles to settle. The supernatant was transferred to a 1.5 mL amber autosampler vial for subsequent analysis via HPLC with photodiode array detection (Shimadzu LC-20AT Prominence HPLC-DAD). For atrazine degradation over multiple photocatalytic cycles, g-C$_3$N$_4$ was harvested by centrifugation after each cycle, rinsed with ultrapure water, and reused for the next run. The photocatalyst used after four cycles was characterized by SEM-EDS and ATR-FTIR.

Photocatalytic Activity Testing in a Phosphate Buffer

To explore the influence of water chemistries on photocatalytic performance, particularly water matrices representative of water treatment systems, the reactivity of MCB$_{0.07}$ for atrazine degradation was explored in simulated water samples (1 mM phosphate buffer solution with the presence of 5 mM NaHCO$_3$, 50 mM CaCl$_2$, 50 mM MgCl$_2$, 5 mg/L humic acid sodium salt, 5 mg/L NaNO$_3$ as N, or 0.1 mM NaHS; pH 7.3 for all solutions except for NaHCO$_3$ solution with pH 7.5). Ca$^{2+}$ and Mg$^{2+}$ were selected to represent the hardness species in water, NO$_3^-$, humic acid, and HS$^-$ were selected as representative scavengers for oxidative species generated from photocatalytic reactions, and HCO$_3^-$ was selected to represent alkalinity species that could also react with the oxidative species. Atrazine degradation was also conducted in real water samples collected from a water treatment plant (hereinafter "GWP") and a wastewater reclamation facility (hereinafter "BRWRF"). Samples were collected from the raw water of GWP (GWP-1), the final effluent from GWP (GWP-4), the effluent after membrane bioreactor treatment in BRWRF (BRWRF-1), and the final effluent from BRWRF (BRWRF-3), and filtered through a 0.45 μm polyvinylidene fluoride (PVDF) membrane before photocatalytic reactions. For the exploration of long-term effect of complex water matrices for photocatalytic activity, MCB$_{0.07}$ was also added to the water samples and magnetically stirred in the dark for 24 hours to pre-foul the photocatalyst before the photocatalytic reactions. Atrazine was added to the reactor 20 minutes before irradiation to ensure suspension homogeneity, and again, there was no evidence of adsorption in any system. pH and alkalinity of these real water samples are listed in Table 1.

TABLE 1

|  | GWP-1 | GWP-4 | BRWRF-1 | BRWRF-3 |
|---|---|---|---|---|
| pH | 6.7 | 7.2 | 7.5 | 7.0 |
| Alkalinity (mg/L as $CaCO_3$) | 56 | 61 | 87 | N/A |

HPLC Analysis

The Shimadzu LC-20AT Prominence HPLC System was equipped with a Shimadzu C18 column (4.6×50 mm, 1.8 μm particle size).

The HPLC analysis method for phenol was based on previous work (Arana, J., et al.; Photocatalytic degradation of phenolic compounds with new $TiO_2$ catalysts. *Appl. Catal., B* 2010, 100 (1-2), 346-354) and employed a mobile phase of 1 mM sodium acetate: ACN (65:35) at pH 3, a flow rate of 0.75 mL/min, an injection volume of 20 μL, and a 254 nm detection wavelength.

The HPLC analysis method for atrazine was based on previous work (Newcombe, D. A., et al.; Bioremediation of atrazine-contaminated soil by repeated applications of atrazine-degrading bacteria. *Appl. Microbiol. Biotechnol.* 1999, 51 (6), 877-882) and employed a mobile phase of ultrapure water: ACN (50:50), a flow rate of 1 mL/min, an injection volume of 100 μL, and a 223 nm detection wavelength.

The HPLC analysis method for carbamazepine was based on previous work (Borisover, M., et al.; Enhancement effect of water associated with natural organic matter (NOM) on organic compound-NOM interactions: A case study with carbamazepine. *Chemosphere* 2011, 82 (10), 1454-1460) and had a mobile phase of ultrapure water: ACN (55:45), a flow rate of 1 mL/min, an injection volume of 25 μL, and a 213 nm detection wavelength.

The HPLC analysis method for sulfamethoxazole was based on previous work (Nalbandian, M. J., et al.; Tailored synthesis of photoactive TiO2 nanofibers and Au/TiO2 nanofiber composites: Structure and reactivity optimization for water treatment applications. *Environ. Sci. Technol.* 2015, 49 (3), 1654-1663) and had a mobile phase of 5 mM potassium phosphate monobasic (pH adjusted to 5.0): methanol (70:30), a flow rate of 1 mL/min, an injection volume of 20 μL, and a 268 nm detection wavelength.

II. Results and Discussion

DFT Simulations

Figure 6:
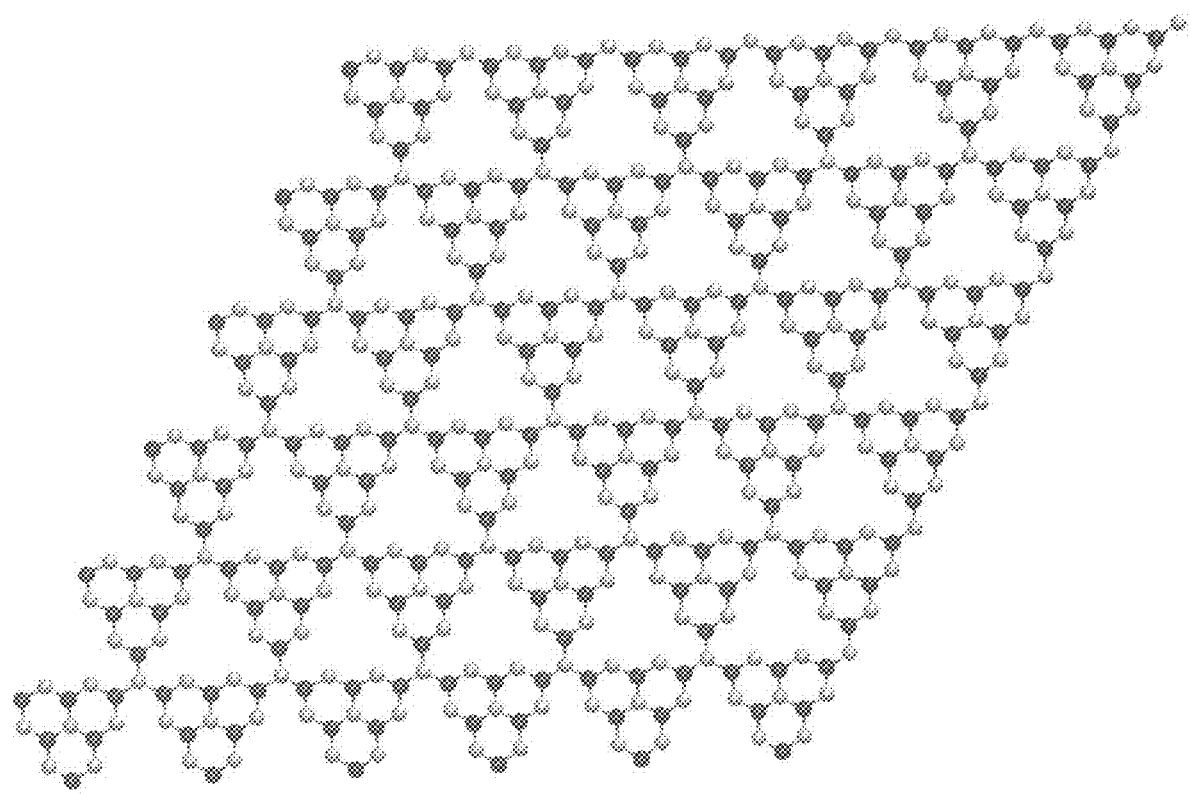
FIG. 6 is an illustration of an undoped g-$C_3N_4$ sheet employed in electronic structure calculations in accordance with various embodiments of the present disclosure.
Figure 7:
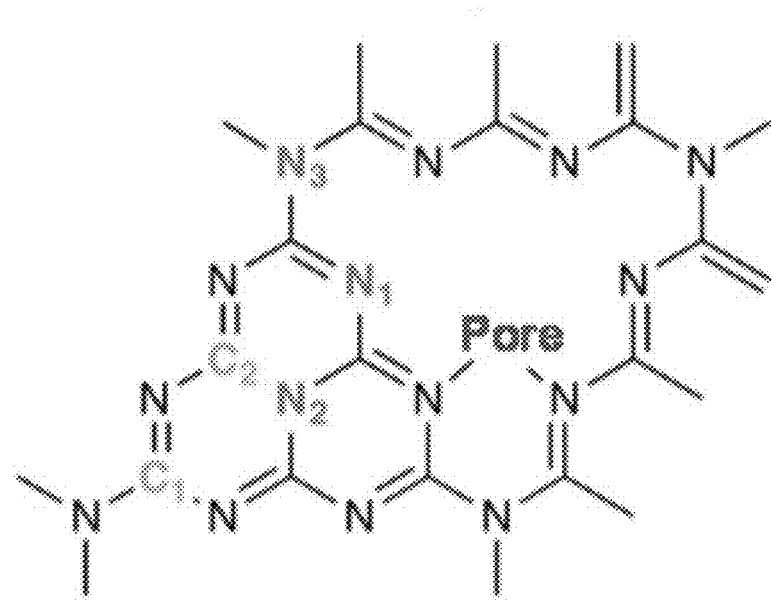
FIG. 7 is an illustration of designated sites for the doping of a g-$C_3N_4$ sheet, the doping sites designated as $N_1$, $N_2$, $N_3$, $C_1$, $C_2$, and pore, in accordance with various embodiments of the present disclosure.

Preliminary DFT studies were performed on an undoped, HSE06-optimized (3×3) g-$C_3N_4$ supercell (FIG. 6), revealing a planar geometry and a bandgap of 2.75 eV (Table 2, below). The conduction and valence band edges (−1.03 and 1.71 eV), measured with respect to the absolute potential of the standard hydrogen electrode (SHE; 4.44 eV), likewise lie near known experimentally determined values of −0.83 and 1.83 eV. Due to the accuracy of DFT simulations, carbon and phosphorus doping at three inequivalent nitrogen sites ($N_1$, $N_2$, and $N_3$), phosphorus substitution at inequivalent carbon atoms ($C_1$ and $C_2$), and the incorporation of phosphorus within the g-$C_3N_4$ pore (i.e., interstitial doping), all with one dopant introduced to one doping site of HSE06-optimized (3×3) g-$C_3N_4$ supercell were explored. The doped materials are labeled as A→B doped g-$C_3N_4$ for further discussion (A is the doping site of $N_1$, $N_2$, $N_3$, $C_1$, $C_2$, and Pore, and B is the doping element of C or P). The $N_1$, $N_2$, $N_3$, $C_1$, $C_2$, and Pore doping sites are illustrated in FIG. 7.

To determine the thermodynamic ability of these materials to generate ROS (e.g., .OH, $O_2^-$/$HO_2$., $H_2O_2$, and $^1O_2$) and holes, their valence band maximum (VBM) and conduction band minimum (CBM) was quantified in conduction with an implicit solvation model, represented by the highest occupied molecular orbital (HOMO) and lowest unoccupied molecular orbital (LUMO) energies, respectively. Table 2 provides calculated values of the band gap, the CBM and the VBM of g-$C_3N_4$ doped with carbon or phosphorus at various locations, in conformity with the description of FIG. 6, based on DFT simulations. The CBM and VBM values are versus a standard hydrogen electrode (SHE). Reported redox potentials for $O_2$/$O_2^-$., $H_2O_2$/.OH, $O_2$/$H_2O_2$, $O_2^-$./$H_2O_2$, and .OH/$H_2O$ are −0.16, 0.32, 0.70, 0.94 and 2.33 V vs. SHE, respectively. According to the DFT simulations, $N_1$→C, $N_3$→C, $N_1$→P, $N_2$→P, and $N_3$→P doped g-$C_3N_4$ can produce $O_2^-$. via one-electron reduction of $O_2$ because their CBM is more negative than the redox potential of $O_2$/$O_2^-$. ($E_0$($O_2$/$O_2^-$.)=−0.16 V vs SHE). All doped materials are able to produce $H_2O_2$ and —OH from the one-electron reduction of $O_2^-$. and $H_2O_2$, respectively ($E_0$($O_2^-$./$H_2O_2$)= 0.94 V and $E_0$($H_2O_2$/.OH)=0.32 V vs SHE). However, $O_2$ reduction for $O_2^-$. formation is the first step for ROS production on the conduction band (i.e., sequential reduction of $O_2$→$O_2^-$.→$H_2O_2$→.OH), and those doped g-$C_3N_4$ that cannot reduce $O_2$ may not produce sufficient ROS and thus result in low photocatalytic activity for contaminant degradation. Multielectron reduction could facilitate ROS production on the conduction band because it is more thermodynamically favorable than one-electron reduction ($E_0$($O_2$/$H_2O_2$)=0.70 V vs SHE), but the loading of co-catalysts (e.g., Pt, Au, and Cu(II)) may be required.

TABLE 2

| Composition (Doping site) | Band Gap (eV) | CBM (V) | VBM (V) |
|---|---|---|---|
| Undoped g-$C_3N_4$ | 2.75 | −1.03 | 1.71 |
| $N_1$ → C doped g-$C_3N_4$ | 2.58 | −1.01 | 1.57 |
| $N_2$ → C doped g-$C_3N_4$ | 2.08 | 0.05 | 2.13 |
| $N_3$ → C doped g-$C_3N_4$ | 2.94 | −0.67 | 2.28 |
| $N_1$ → P doped g-$C_3N_4$ | 2.06 | −0.71 | 1.36 |
| $N_2$ → P doped g-$C_3N_4$ | 1.69 | −0.20 | 1.49 |
| $N_3$ → P doped g-$C_3N_4$ | 2.90 | −0.70 | 2.20 |
| $C_1$ → P doped g-$C_3N_4$ | 1.93 | 0.12 | 2.05 |
| $C_2$ → P doped g-$C_3N_4$ | 1.86 | 0.19 | 2.05 |
| Pore → P doped g-$C_3N_4$ | 1.14 | −0.06 | 1.08 |

Figure 8:
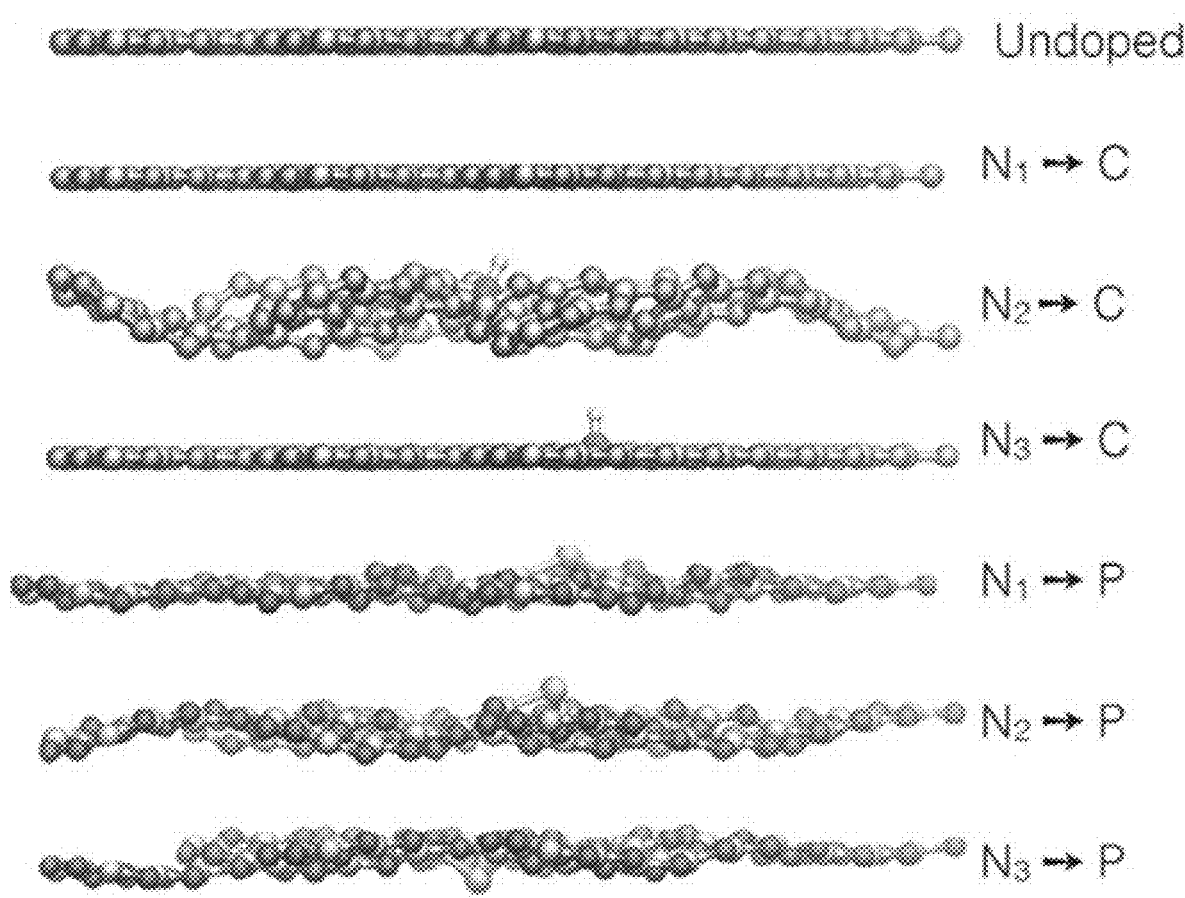
FIG. 8 is an illustration of optimized geometries of undoped and doped g-$C_3N_4$ compositions in accordance with various embodiments of the present disclosure.

FIG. 8 is an illustration of the optimized geometry of undoped and doped forms of g-$C_3N_4$. As illustrated, both $N_1$→C and $N_3$→C doped g-$C_3N_4$ exhibit a planar geometry similar to that of undoped g-$C_3N_4$. Conversely, $N_2$→C doped g-$C_3N_4$ is characterized by a significant out-of-plane deformation. The $N_{1-3}$→P geometries are collectively more distorted, each exhibiting some degree of undulation due to the bulky phosphorus substituent, and are presumably less thermodynamically stable than their carbon-doped counterparts due to strain. Following these observations, the hole distribution in the valence band (HOMO) and electron distribution of the conduction band (LUMO) of these materials were determined. While the HOMO of undoped g-$C_3N_4$ is relatively delocalized, the LUMO exhibits a staggered distribution on alternating trimers. The same trend is observed for the LUMO of carbon-doped systems, though $N_2$→C doped g-$C_3N_4$ exhibits a higher degree of localization due to a pronounced "tenting" of the g-$C_3N_4$ sheet. The HOMO of carbon-doped g-$C_3N_4$ is markedly different from the undoped material and is distributed around the dopant site. While the orbital structure will undergo remodeling subsequent to exciton formation and charge migration, it is reasonable to speculate that the impurity-localized valence electrons provide the primary sites for localized hole formation within the valence band of doped g-$C_3N_4$.

Photocatalytic Performance of C- and P-Doped g-$C_3N_4$

The effect of nonmetal doping on the photocatalytic performance of g-$C_3N_4$ was evaluated by testing $MCB_x$ or $MCE_y$ for phenol and/or atrazine degradation under simulated visible sunlight irradiation ($\lambda$>400 nm, xenon lamp) and comparing the activity with MC.

Figure 9:
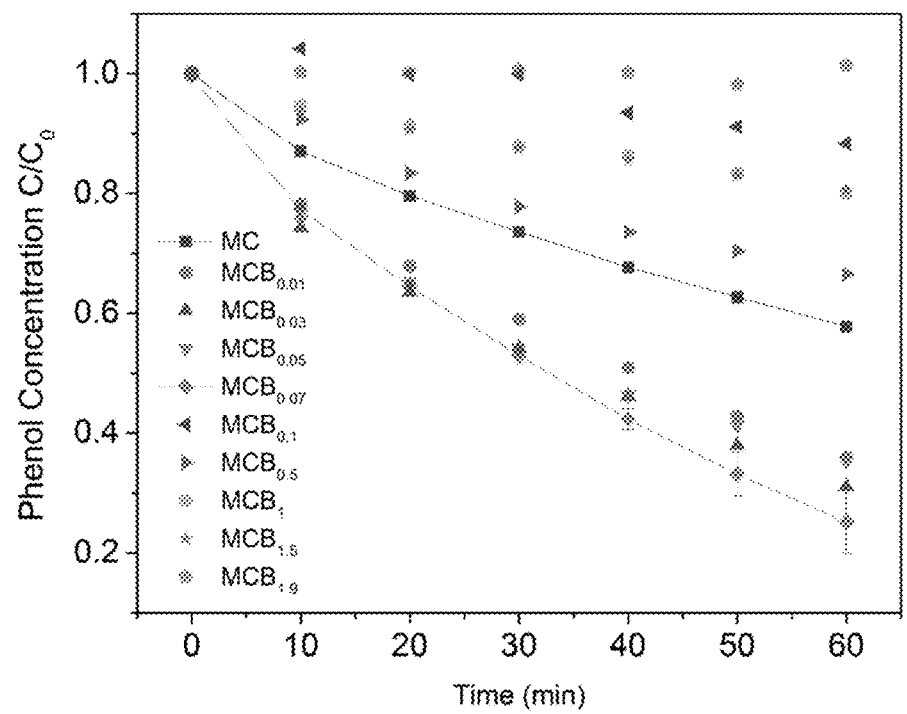
FIG. 9 is a graphical display of phenol degradation over time using $MCB_x$ (x=0.01-1.9), under simulated visible light irradiation, in accordance with various embodiments of the present disclosure.
Figure 10:
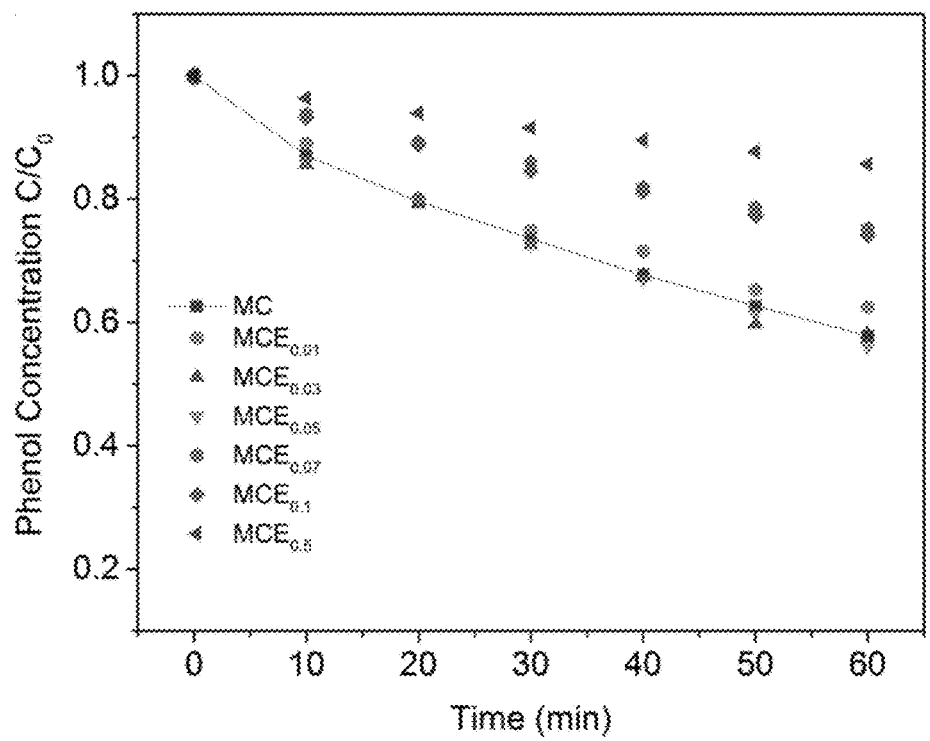
FIG. 10 is a graphical display of phenol degradation over time using $MCE_y$ (y=0.01-0.5), under simulated visible light irradiation, in accordance with various embodiments of the present disclosure.

FIG. 9 is a graphical representation of the photocatalytic activity for phenol degradation of $MCB_x$ compositions synthesized with varying amounts of barbituric acid. As shown in FIG. 10, the synthesized $MCB_x$ exhibited significantly enhanced photocatalytic activity, especially at the low barbituric acid content (i.e., x=0.01-0.07). $MCB_{0.07}$ had the highest reaction rate constant, and its reactivity was enhanced by 2.8-fold compared to that of MC (0.8±0.08 vs 0.3±0.02 $m^2$/(mol of photons)). The photocatalytic activity of $MCB_x$ significantly decreased at higher barbituric acid mass loadings (x>0.1), likely due to excessive carbon doping promoting charge recombination.

FIG. 10 is a graphical representation of the photocatalytic activity for phenol degradation of $MCE_y$ compositions synthesized with varying amounts of etidronic acid. As can be seen, only $MCE_{0.03}$ and $MCE_{0.05}$ performed marginally better than the undoped MC composition.

Figure 11:
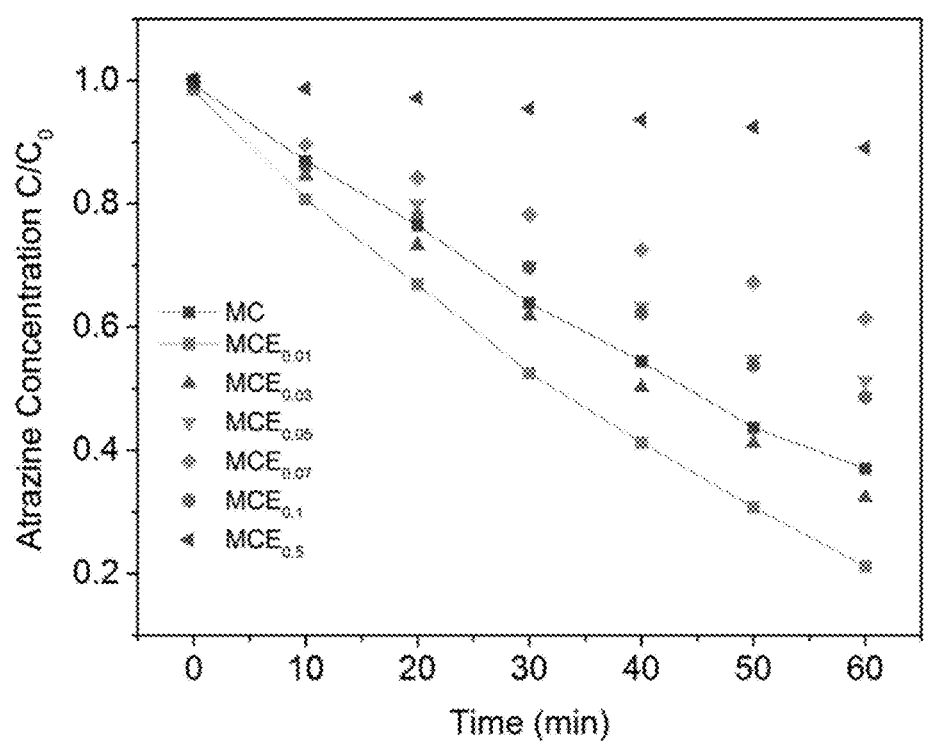
FIG. 11 is a graphical display of atrazine degradation over time using $MCE_y$ (y=0.01-0.5), under simulated visible light irradiation, in accordance with various embodiments of the present disclosure.

FIG. 11 is a graphical representation of the photocatalytic activity for atrazine degradation of $MCE_y$ compositions synthesized with varying amounts of etidronic acid. As can be seen, reactivity increase was observed for atrazine degradation on $MCE_{0.01}$ that had the lowest phosphorus doping level 0.6±0.1 and 0.3±0.02 $m^2$/(mol of photons) for $MCE_{0.01}$ and MC, respectively). A slight activity increase was also observed for $MCE_{0.03}$ as compared to MC.

The experimental results are in agreement with DFT simulation results with carbon-doped g-$C_3N_4$ showing an enhanced activity compared to that of phosphorus-doped g-$C_3N_4$. The carbon-doped supramolecule-based g-$C_3N_4$ with an optimum photocatalytic activity ($MCB_{0.07}$), undoped supramolecule-based g-$C_3N_4$ (MC), and conventional g-$C_3N_4$ (U and M) were selected for further material characterization and water treatment applications.

Relationship Between Photocatalytic Activity and g-$C_3N_4$ Properties.

Figure 12:
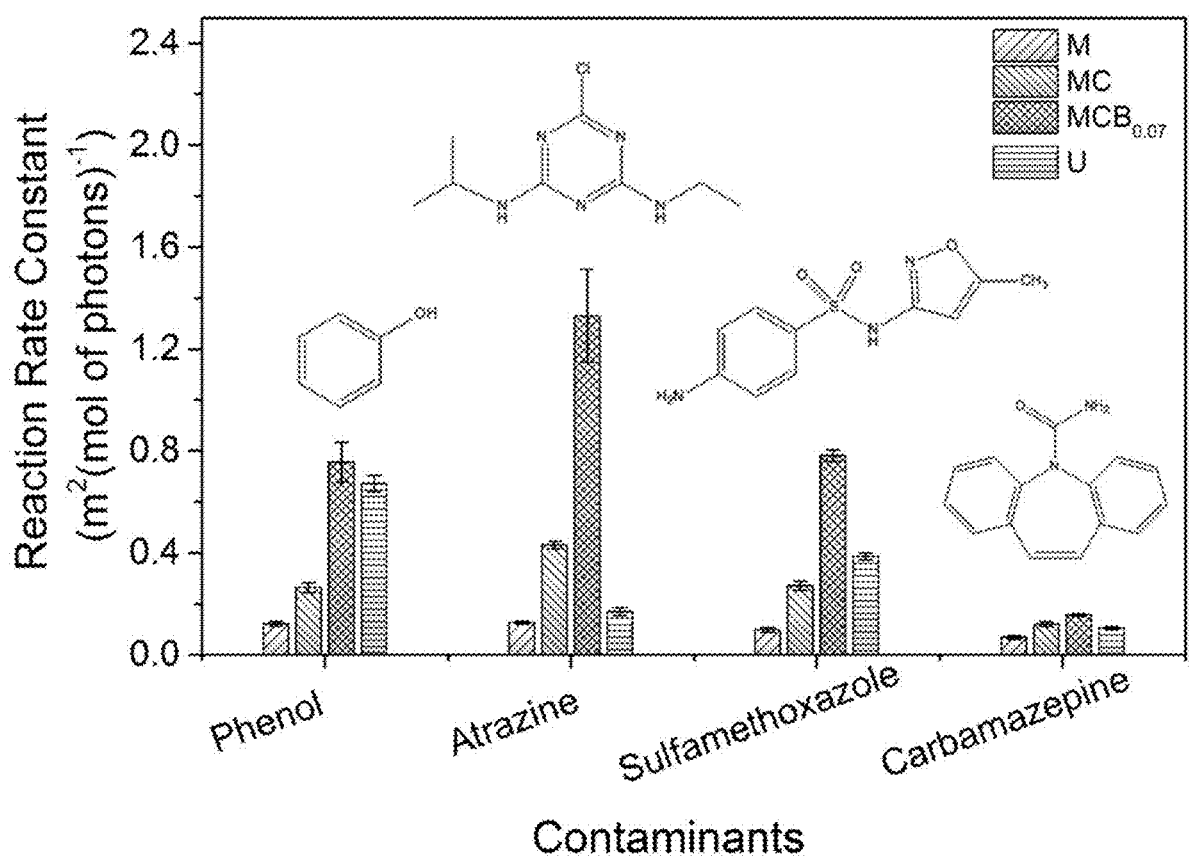
FIG. 12 is a graphical display comparing the photocatalytic degradation rate constants of phenol, atrazine, sulfamethoxazole and carbamazepine using the following g-$C_3N_4$ compositions: 1) g-$C_3N_4$ synthesized from urea (U), 2) g-$C_3N_4$ synthesized from melamine (M), 3) g-$C_3N_4$ synthesized from melamine and cyanuric acid (MC), and 4) g-$C_3N_4$ synthesized from melamine, cyanuric acid, and barbituric acid ($MCB_{0.07}$), in accordance with various embodiments of the present disclosure.

FIG. 12 shows photocatalytic degradation kinetics of phenol and persistent organic micropollutants on g-$C_3N_4$ compositions in the phosphate buffer under simulated visible sunlight irradiation ($\lambda$>400 nm, xenon lamp). $MCB_{0.07}$ showed the highest photocatalytic activity for atrazine, sulfamethoxazole, and carbamazepine compared to that of other g-$C_3N_4$ samples, and its reactivity was on par with U for phenol degradation. M had the lowest reactivity compared to that of its counterpart g-$C_3N_4$ samples. Of the four probe contaminants, atrazine is the most photocatalytically degradable on g-$C_3N_4$ samples (except for U), and carbamazepine is the most persistent in photocatalytic reactions.

Figure 13:
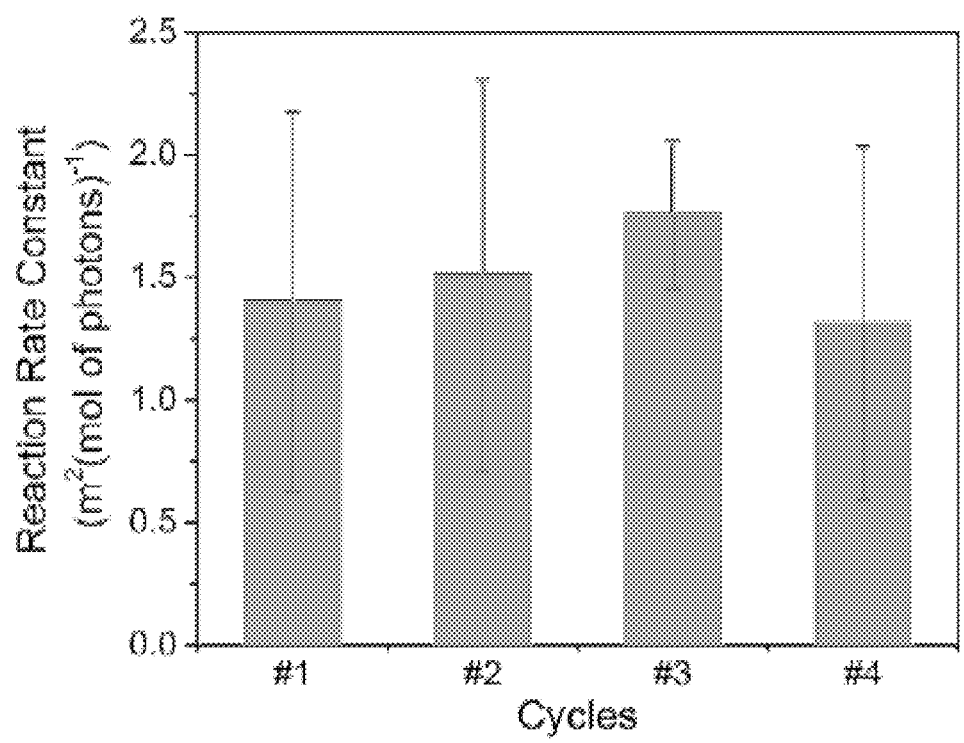
FIG. 13 is a graphical display of photocatalytic rate constants of atrazine degradation using $MCB_{0.07}$ under visible light irradiation over four cycles, in accordance with various embodiments of the present disclosure.
Figure 14:
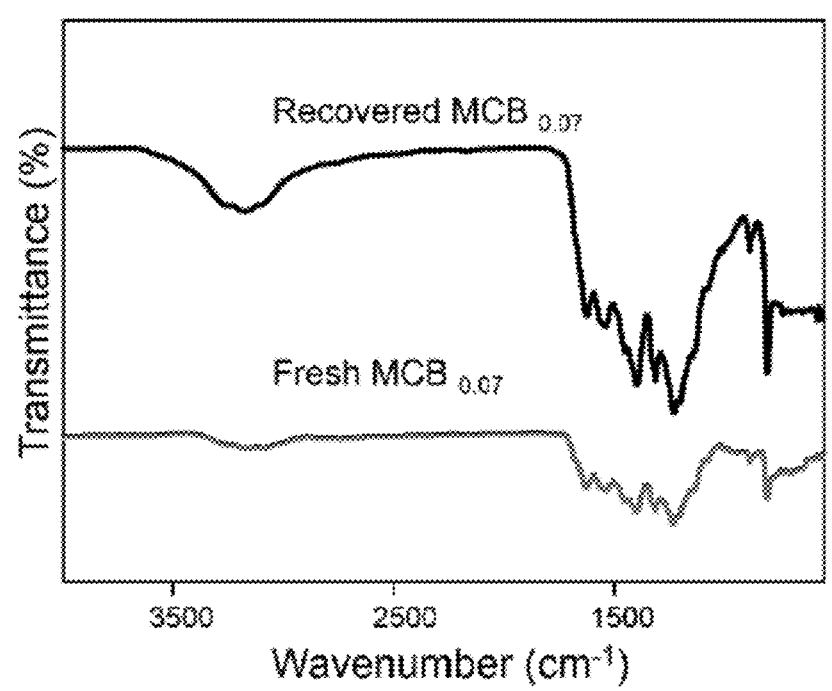
FIG. 14 is an attenuated total reflection-Fourier transform infrared spectroscopic (ATR-FTIR) spectra of freshly prepared and recovered $MCB_{0.07}$ before and after use in an atrazine degradation process in accordance with various embodiments of the present disclosure.
Figure 15:
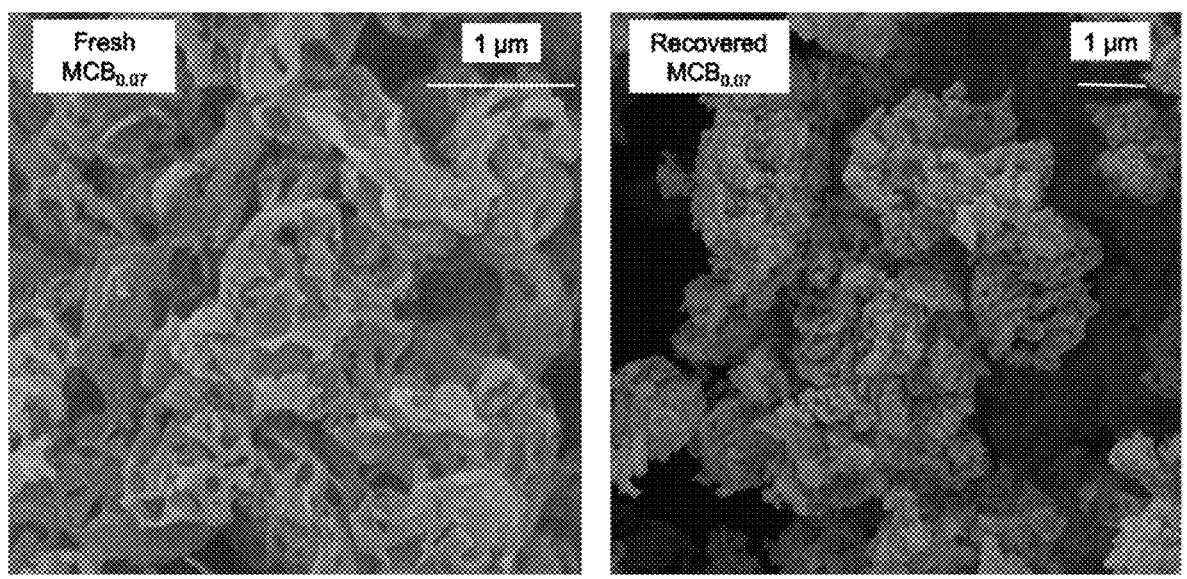
FIG. 15 shows scanning electron microscopic (SEM) images of fresh $MCB_{0.07}$ (left) and $MCB_{0.07}$ recovered after an atrazine degradation process (right) in accordance with various embodiments of the present disclosure.

Atrazine degradation was also explored on $MCB_{0.07}$ over four repeated cycles, and no reactivity loss or morphological/chemical property change of the photocatalyst was observed. For each of the four cycles, an $MCB_{0.07}$ loading of 1 g/L, an initial atrazine concentration of 100 μm, a 1 mM phosphate buffer (pH 7.3), and xenon lamp irradiation at $\lambda$>400 nm was used. FIG. 13 is a graphical display of photocatalytic rate constants of atrazine degradation on $MCB_{0.07}$ under visible light irradiation over the four cycles (error bars represent 95% confidence intervals). FIG. 14 is an ATR-FTIR spectra comparing fresh $MCB_{0.07}$ and $MCB_{0.07}$ recovered after atrazine degradation. FIG. 15 shows SEM images of fresh $MCB_{0.07}$ (left) and $MCB_{0.07}$ recovered after atrazine degradation (right).

The measured photocatalytic activity for contaminant degradation could be influenced by mass transfer and contaminant adsorption on g-$C_3N_4$. Nonetheless, as will be discussed below, mass transfer limitation was eliminated in the reaction, and no contaminant adsorption was measured in the dark experiments. In addition, all g-$C_3N_4$ samples showed a similar negative ζ-potential (i.e., −28.5 to −37.8 mV at pH 7.3), and they were not expected to interact strongly with neutral contaminants in the reaction solution at pH 7.3 (pKa's of phenol, atrazine, sulfamethoxazole, and carbamazepine are 10.0, 1.7, 1.4/5.8, 2.3/13.9, respectively).

The enhancement of photocatalytic activity could be determined by the following key photocatalyst properties: (i) an increased surface area, (ii) improved light harvesting, and (iii) promoted charge separation. Photocatalysis is a surface-mediated reaction, and the increased surface area provides more active sites for the contaminants to reside and react. The improvement of light harvesting and charge separation enables the generation of more electrons and holes for photocatalytic reactions. $MCB_{0.07}$ exhibited the highest surface area, and its reactivity outperformed M and MC for the degradation of all probe contaminants. The charge separation of $MCB_{0.07}$ and MC was significantly promoted compared to M, and M showed the lowest reactivity for contaminant degradation. The low carbon doping of $MCB_{0.07}$ did not change its band gap, but midgap states possibly increased visible light absorption and photocatalytic activity. The results indicate that the enhanced surface area, visible light absorption, and charge separation of $MCB_{0.07}$ synergistically contribute to improving the photocatalytic activity.

Selective Contaminant Degradation on g-$C_3N_4$.

Figure 16:
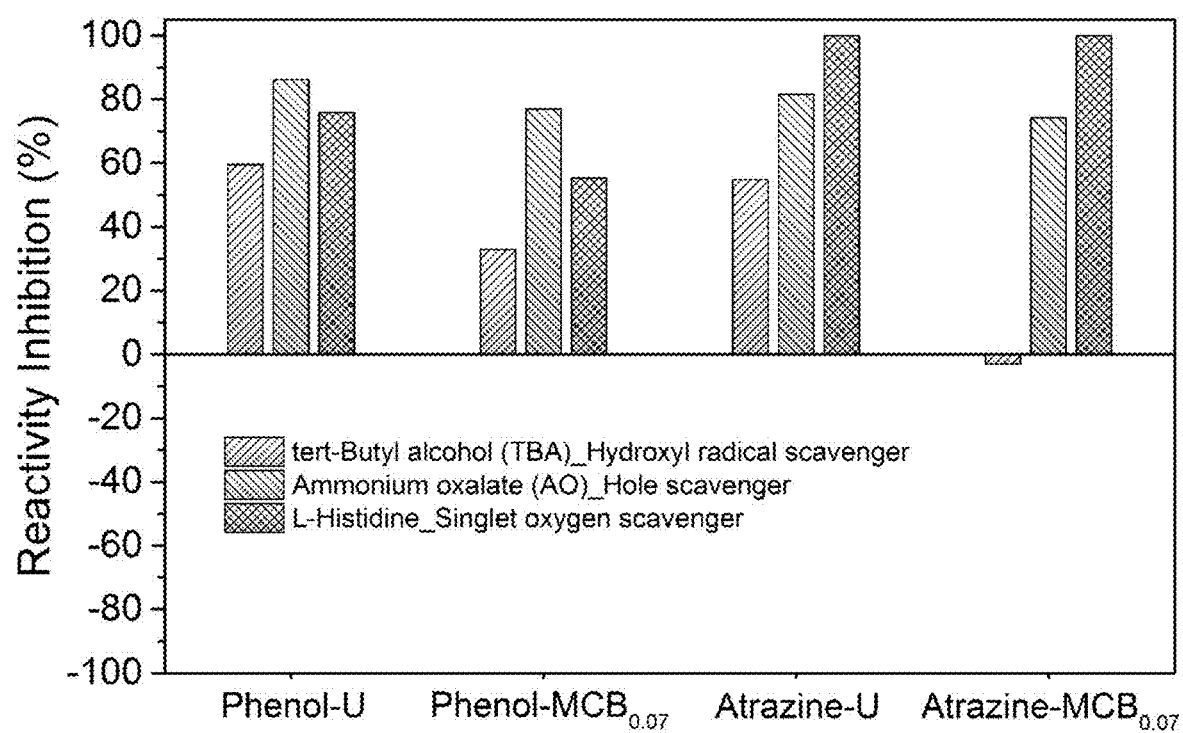
FIG. 16 is a graphical display of the reactivity inhibition of phenol and atrazine degradation using U and $MCB_{0.07}$ in the presence of various scavengers (10 mM of tert-butyl alcohol as a .OH scavenger, 10 mM of ammonium oxalate as a hole scavenger, and 10 mM of L-histidine as a $^1O_2$ scavenger) in accordance with various embodiments of the present disclosure.

It is worth noting that g-$C_3N_4$ is selective for contaminant degradation. $MCB_{0.07}$ is 1.8 times more reactive for the degradation of atrazine than phenol; however, U is 3.9 times more reactive for the degradation of phenol than atrazine. Similar selective degradation of sulfamethoxazole was also observed in comparison with phenol or atrazine. To understand the mechanism of selective contaminant removal, the significance of the ROS and hole for the photocatalytic degradation of phenol and atrazine was explored. Scavenger tests were conducted to quench the reactions between contaminants and a specific oxidative species, and the inhibition of reactivity was used to evaluate the contribution of the specific oxidative species to photocatalytic degradation. The results, as shown in FIG. 16, indicated that the addition of tert-butyl alcohol (10 mM), a •OH scavenger, reduced the reactivity for phenol degradation by 60% on U compared to 33% on $MCB_{0.07}$. The •OH scavenger test also showed 55% of reactivity inhibition for atrazine degradation on U, in contrast to no inhibition for atrazine degradation on $MCB_{0.07}$. However, the addition of ammonium oxalate (10 mM), a hole scavenger, significantly inhibited the reactivity for phenol and atrazine degradation on both U and $MCB_{0.07}$ from 74 to 86%. The addition of L-histidine (10 mM), a $^1O_2$ scavenger, reduced the reactivity of phenol degradation by 76% on U compared to 55% on $MCB_{0.07}$ and fully inhibited the reactivity for atrazine degradation on both U and $MCB_{0.07}$. For these experiments, a photocatalyst (U or $MCB_{0.07}$) loading of 1 g/L, an initial atrazine concentration of 100 μm, a 1 mM phosphate buffer (pH 7.3), and xenon lamp irradiation at $\lambda$>400 nm was used.

Figure 17:
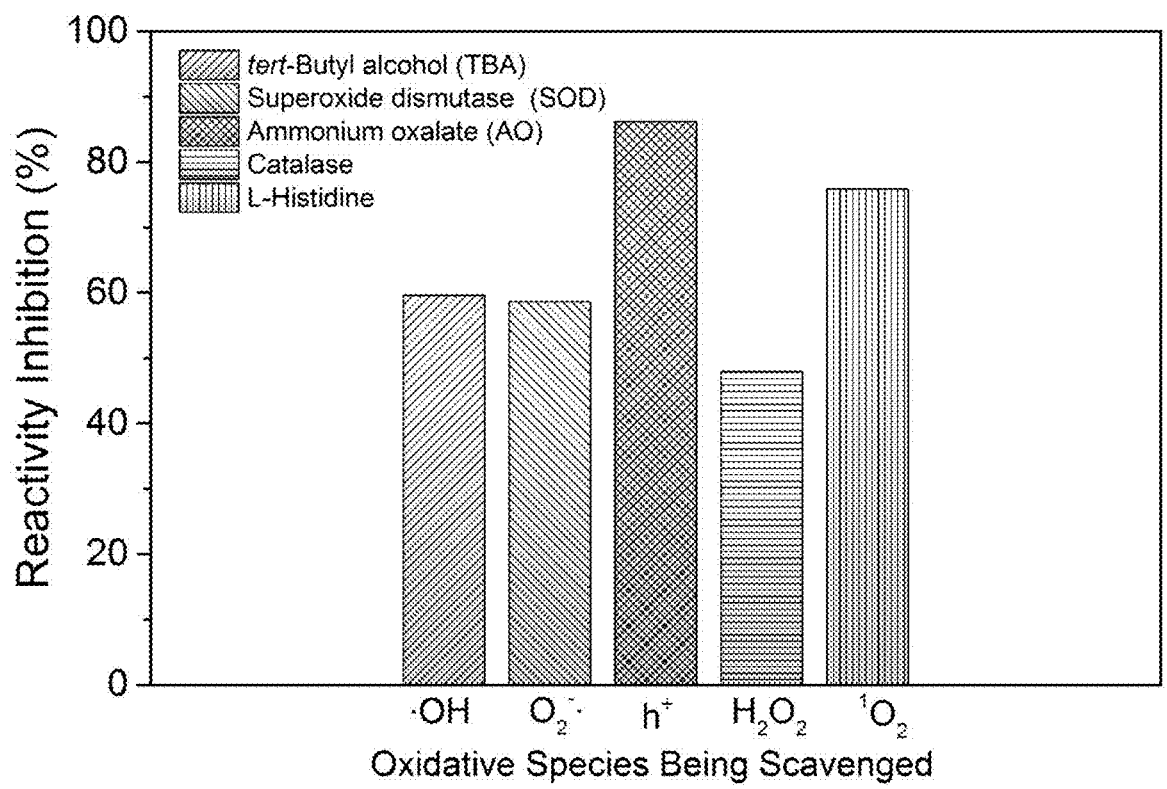
FIG. 17 is a graphical display of the reactivity inhibition of phenol degradation using U in the presence of various scavengers (10 mM of tert-butyl alcohol as a .OH scavenger, 10 mM of ammonium oxalate as a hole scavenger, and 10 mM of L-histidine as a $^1O_2$ scavenger, 2 U/mL of superoxide dismutase as a $O_2^-$. scavenger, and 200 U/mL of catalase as a $H_2O_2$ scavenger) in accordance with various embodiments of the present disclosure.

With being bound to any particular theory, it is believed that the production of oxidative species on g-$C_3N_4$ is structurally sensitive; different g-$C_3N_4$ compositions generate different types and amounts of oxidative species. Phenol is known to be more reactive with .OH than atrazine with .OH, and the second-order rate constant of .OH-phenol is 5.9-fold higher than that of .OH-atrazine ($1.4 \times 10^{10}$ vs $2.4 \times 10^9$ s$^{-1}$ M$^{-1}$). U may generate more .OH than MCB$_{0.07}$, and quenching .OH had more pronounced inhibition for phenol degradation. MCB$_{0.07}$ may produce a significant amount of other ROS, e.g., O$_2^-$./HO$_2$. and $^1$O$_2$, to facilitate atrazine degradation. Though .OH is generally more reactive (second-order reaction rate constant between ROS and organics are $10^6$-$10^{10}$, $10^3$-$10^{10}$, or $<10^8$ M$^{-1}$ s$^{-1}$ for .OH, $^1$O$_2$, or O$_2^-$./HO$_2$., respectively), its steady-state concentration is orders of magnitude lower in water compared to that of other ROS. The other ROS, especially $^1$O$_2$, may be a leading contributor to atrazine degradation; quenching .OH had a negligible effect on atrazine degradation on MCB$_{0.07}$, but quenching $^1$O$_2$ completely deactivated photocatalytic atrazine degradation. In contrast, U could produce .OH as one dominant ROS, and hence atrazine degradation on U is slower, and quenching .OH reduces the reactivity significantly. The hole and $^1$O$_2$ are the most dominant oxidative species for contaminant degradation, regardless of g-C$_3$N$_4$ properties. O$_2^-$. and H$_2$O$_2$ were also identified in the photocatalytic degradation of phenol on U, and their contribution to reaction kinetics was also critical (FIG. 17). In FIG. 17, the reactivity inhibition (%) was calculated by dividing the reactivity difference without and with the scavenger by the reactivity without the scavenger. For these experiments, a photocatalyst (U or MCB$_{0.07}$) loading of 1 g/L, an initial atrazine concentration of 100 μm, a 1 mM phosphate buffer (pH 7.3), and Xenon lamp irradiation at λ>400 nm was used.

Performance Comparison in Matrixes Representative of Water and Wastewater Treatment.

Figure 18:
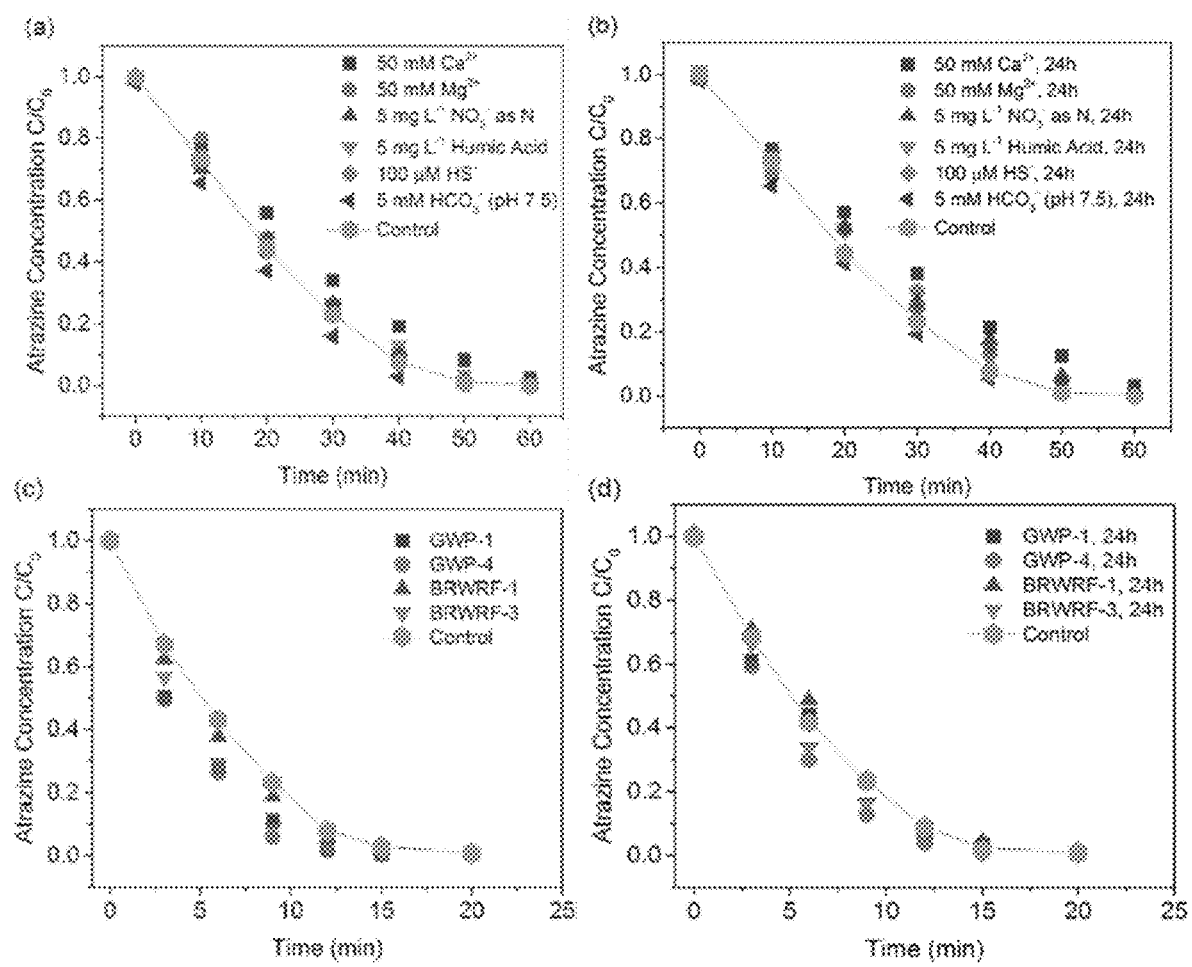
FIG. 18 shows graphical displays of atrazine degradation using (a) freshly prepared $MCB_{0.07}$ suspension in simulated water samples, (b) 24 hour-aged $MCB_{0.07}$ suspension in simulated water samples, (c) freshly prepared $MCB_{0.07}$ suspension in real water samples (raw or (partially) treated water and wastewater from plants), and (d) 24 hour-aged $MCB_{0.07}$ suspension in real water samples (raw or (partially) treated water and wastewater from plants) under simulated visible sunlight irradiation (xenon lamp, $\lambda > 400$ nm) in accordance with various embodiments of the present disclosure.

For all experiments conducted in the simulated and real water samples and with both fresh and aged MCB$_{0.07}$, little to no inhibition was observed in atrazine degradation, as shown in FIG. 18. Graphical display (a) of FIG. 18 shows atrazine degradation by a freshly prepared MCB$_{0.07}$ suspension in simulated water samples. Graphical display (b) of FIG. 18 shows atrazine degradation by a 24-hour aged MCB$_{0.07}$ suspension in simulated water samples. Graphical display (c) of FIG. 18 shows atrazine degradation by a freshly prepared MCB$_{0.07}$ suspension in real water samples. Graphical display (d) of FIG. 18 shows atrazine degradation by a 24-hour aged MCB$_{0.07}$ suspension in real water samples. In the experiments, simulated visible sunlight irradiation (xenon lamp, λ>400 nm) was used. The initial concentration of atrazine was 100 μM in simulated water samples and 20 μM in real water samples. Atrazine degradation was faster with the lower initial concentration of 20 μM. Control experiments were conducted under the same experimental conditions in a phosphate buffer (pH 7.3, 1 mM) prepared from ultrapure water. The foulants or natural water constituents were amended into the phosphate buffer for simulated water tests. No phosphate buffer was used for the real water tests. Photocatalyst loading was 1 g/L. The excellent photocatalytic performance of g-C$_3$N$_4$ in complex water matrixes may be attributed to the large surface area, high porosity, the polymeric nature of the material without metal loading, and the selective ROS production.

Increased surface area and porosity may afford sufficient sites to interact with contaminants even when foulants or natural water constituents are at a high concentration (i.e., mM of foulants or constituents vs μM of contaminants). Noble metals used in photocatalysis (e.g., Au) are reactive and susceptible to fouling, and the polymeric nature of g-C$_3$N$_4$ with the presence of only carbon and nitrogen mitigates the likelihood of photocatalyst deactivation. In addition, the hydrophilic nature of g-C$_3$N$_4$ reduces the adsorption of organic or biological foulants, and the tri-s-triazine unit in g-C$_3$N$_4$ is not expected to bind strongly to the carboxylate group of NOM, in contrast to TiO$_2$.

The selective production of ROS may also contribute to the minimal inhibition of photocatalytic activity in complex water matrices. —OH is the most powerful, nonselective radical generated in most AOPs and is attractive for environmental applications because it can degrade most organic contaminants at near diffusion-limited rates. However, the nonselective destruction of contaminants can be easily compromised when non-target chemicals are present, including NOM and other background constituents present in raw natural water or (partially) treated water and wastewater. In the presently described system, MCB$_{0.07}$ may generate other ROS predominantly rather than .OH, such as $^1$O$_2$ and O$_2^-$./HO$_2$., which are more selective for contaminant degradation. For example, $^1$O$_2$ selectively oxidizes electron-rich moieties of contaminants with the presence of NOM, and O$_2^-$./HO$_2$. facilitates the degradation of halogenated compounds because of the synergy of reductive dehalogenation and the oxidation of carbon backbones (O$_2^-$./HO$_2$. can act as both a reductant and an oxidant).

The exploration of the structural sensitivity is significant for the application of g-C$_3$N$_4$ in contaminant degradation because the synthesis and properties of g-C$_3$N$_4$ compositions can be tailored to selectively degrade a certain group of highly toxic, low concentration contaminants with minimized inhibition from co-contaminants, natural water constituents, or foulants. It may also be useful for designing photocatalysts for selective oxidation and conversion of contaminants to value-added products (e.g., benzene oxidation to phenol). Further studies may be helpful to quantitatively analyze the production of oxidative species and identify key g-C$_3$N$_4$ properties for the selective generation of oxidative species and degradation of contaminants. Factors beyond the generation of oxidative species, such as the affinity of g-C$_3$N$_4$ to contaminants, may also be important for the selectivity in contaminant degradation. The affinity between the photocatalyst and contaminant may be tailored for selective reactions.

Influence of Mass Transfer Processes on Observed Reaction Rates

The following calculations were performed to investigate the potential effects of aqueous/solid and intraparticle mass transfer processes on the observed reaction rates. The results indicate that mass transfer was not expected to limit the observed reaction rates in the presently disclosed systems.

Aqueous/Solid Mass Transfer Limitations

Here, the lower limit for the aqueous/solid mass transfer rate constant for atrazine degradation on MCB$_{0.07}$ ($k_{aq/s}a$) was estimated and compared to the measured reaction rate constant. Atrazine degradation on MCB$_{0.07}$ was selected because it showed the fastest degradation kinetics compared to the other photocatalytic reactions of the present application. Criteria for the evaluation of potential influence of aqueous/solid mass transfer limitations on the observed rate constants are 1) No aqueous/solid mass transfer limitations expected if calculated $k_{aq/s}a$ is much greater than the largest measured $k_{obs,\ MCB}$ value; and 2) Significant potential for aqueous/solid mass transfer limitations is expected if $k_{aq/s}a$ is close to or less than the measured $k_{obs,\ MCB}$ value.

The slip velocity method is used to calculate the mass transfer coefficient ($k_{aq/s}$) for particles traveling at the slip velocity ($u_t$) relative to the suspending liquid. Because the particle size of $MCB_{0.07}$ was much smaller than 1 mm, Stokes' law is assumed to be applicable and the particle's slip velocity is calculated by:

$$u_t = \frac{g d_p^2 (\rho_p - \rho)}{18 \mu} \quad (3)$$

where g is the gravity constant, $d_p$ and $\rho_p$ are the hydrodynamic diameter and density of the photocatalyst particle, respectively, $\rho$ is the density of water, and $\mu$ is the absolute viscosity of water.

The aqueous/solid mass transfer coefficient is then estimated by the following expression:

$$k_{aq/s} = \frac{D_{mol}}{d_p} Sh = \frac{D_{mol}}{d_p}(2 + 0.6 \; Re^{0.5} Sc^{0.33}) \quad (4)$$

where $D_{mol}$ is the molecular diffusion coefficient of the reacting solute (atrazine), Sh is the Sherwood number, Re is the modified Reynold's number, and Sc is the Schmitt number. The last two parameters are calculated by the following expressions:

$$Re = \frac{d_p u_t}{v_{H_2O}} \quad (5)$$

$$Sc = \frac{v_{H_2O}}{D_{mol}} \quad (6)$$

where $v_{H_2O}$ is the kinematic viscosity of water. The molecular diffusion coefficient for atrazine in water is calculated using:

$$D_{mol} = \frac{13.26 \times 10^{-5}}{\mu^{1.14} (v')^{0.589}} \quad (7)$$

where $D_{mol}$ is in the unit of cm²/s, $\mu$ is in the unit of g m⁻¹ s⁻¹, and v' is the molar volume of atrazine, which is 250.6 cm³/mol, calculated using the LeBas method. Plugging the results into equation 5, using $\mu$=1.002 g/(m s) (at 20° C.), then $D_{mol}$=5.11×10⁻¹⁰ m²/s. The values and other physical constants summarized in Table 3 are then used in equations 3-6 to determine that $k_{aq/s}$=4.30×10⁻⁴ m/s.

TABLE 3

| Constant | Value |
|---|---|
| $D_{mol}$ of atrazine | 5.11 × 10⁻¹⁰ m²/s |
| Gravity constant, g | 9.81 m/s² |
| Photocatalyst particle diameter, $d_p$ | 2.39 × 10⁻⁶ m, determined by dynamic light scattering |
| Kinematic viscosity of water, $v_{H_2O}$ | 1.003 × 10⁻⁶ m²/s (at 20° C.) |
| Particle Density, $\rho_p$ | 1.34 × 10⁶ g/m³ |
| Water density, $\rho$ | 9.98 × 10⁵ g/m³ (at 20° C.) |
| Absolute viscosity of water, $\mu$ | 1.002 g/(m s) (at 20° C.) |

To calculate the mass transfer rate constant, the mass transfer coefficient should be multiplied by the geometric surface area of the catalyst per volume of solution, a:

$$a = \frac{\text{total surface area}}{\text{total volume}} = \frac{SA_p \times M}{\rho_p \times V_p} \times \frac{1}{V_R} \quad (8)$$

where $SA_p$ is the geometric surface area of one $MCB_{0.07}$ aggregate, which is assumed to have a spherical structure; M is the mass of photocatalyst in the reactor; $V_p$ is the volume of one $MCB_{0.07}$ aggregate; and VR is the volume of reaction suspension. For the fastest reaction measured, M=0.015 g and VR=0.015 L, so a=1871 m⁻¹ and $k_{aq/s}$a=0.8 s⁻¹. This value is about 3 orders-of-magnitude larger than the measured $k_{obs,MCB}$ value (8.0×10⁻⁴ s⁻¹). Thus the results indicate the aqueous/solid mass transfer is expected to have negligible limitation on the measured reaction rates.

Intraparticle Mass Transfer Limitations

The potential of intraparticle mass transfer resistance is also investigate by using the following criteria: 1) no resistance to pore diffusion if $(k_{obs}L^2)/D_e$<1, and 2) significant resistance to pore diffusion if $(k_{obs}L^2)/D_e$>1, where L is characteristic diffusion path length for the photocatalyst and $D_e$ is the effective diffusivity of the reacting solute. L and $D_e$ are estimated using the following equations:

$$L = \frac{1}{6} d_p \quad (9)$$

$$D_e = \frac{D_{mol} \theta}{\tau} \quad (10)$$

where $\theta$ is the porosity of the photocatalyst particle (typically ranging from 0.2-0.7) and $\tau$ is the tortuosity factor (typically ranging from 2-10). The most conservative values from each range are used to maximize the possibility that the criterion $(k_{obs}L^2)/D_e$>1 is met (i.e., we chose the smallest $\theta$ (0.2) and largest $\tau$ (10) in order to obtain the smallest possible $D_e$ value), and, in turn, the largest possible value for equation 9 is L=3.99×10⁻⁷ m and the largest possible value for equation 10 is $D_e$=1.02×10⁻¹¹ m²/s.

The largest observed reaction rate constant was 8.0× 10's⁻¹ for atrazine degradation on $MCB_{0.07}$. This rate constant and the values of L and $D_e$ calculated above are then used to test the two criteria outlined above to find a $(k_{obs}L^2)/D_e$ value of 1.25×10⁻⁵ (<<1). Because the $(k_{obs}L^2)/D_e$ value is several orders-of-magnitude less than one, intraparticle mass transfer resistance is negligible on the time scale over which the photocatalytic degradation was observed the presently described system.

Photocatalytic Performance of $MCB_{0.07}$ g-$C_3N_4$ in Antimicrobial Applications Disinfection Experiments of Planktonic *E. coli*.

To generate a standard curve, *E. coli* was cultured in Luria-Bertani broth (LB) at 37° C. with mixing (120 rpm) and was harvested during its late-exponential phase by centrifugation. The *E. coli* was then resuspended with phosphate-buffered saline (PBS) and then the suspension was centrifuged. The supernatant was discarded. This process was repeated for three time. After being washed with PBS, the *E. coli* was resuspended in PBS to form a stock bacterial suspension. Next, the stock suspension was diluted with PBS to form a series of concentrations (10%, 20%, . . . , 100% of the original concentration). The $OD_{600}$ values of bacterial solutions with different concentrations were measured respectively. Five concentrations were selected to conduct plate counting. Bacterial solutions were diluted in series. The relationship between solution concentration and colony-forming units (CFU) were recorded.

Figure 19:
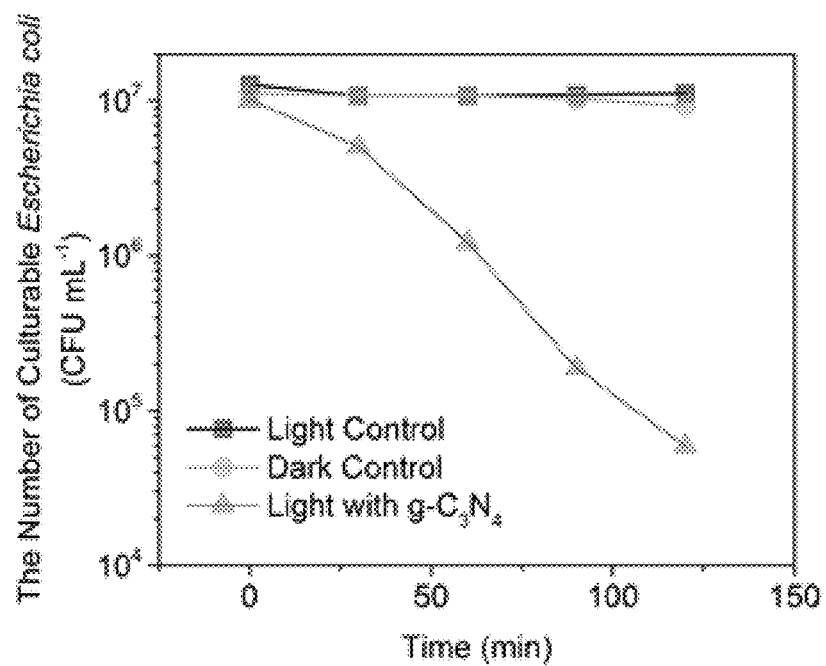
FIG. 19 is a graphical display of E. coli disinfection over time using $g-C_3N_4$ in accordance with various embodiments of the present disclosure.

To test the antimicrobial activity of g-$C_3N_4$, 25 ml of a bacterial suspension (*E. coli* in PBS, $1\times10^7$ CFU/mL) was mixed with 0.001 g of $MCB_{0.07}$ g-$C_3N_4$ powder in a sterile glass beaker. The beaker was placed under a white light emitting diode (LED) lamp (7 W) for bacterial inactivation. The distance between the surface of the bacterial suspension and the LED lamp was maintained at 15 cm. Bacterial suspension samples were withdrawn from the beaker with pipette every half an hour. The samples were duplicated, diluted in series with the PBS buffer, and plate counting was conducted to determine bacterial viability (FIG. 19). As can be seen in FIG. B, after two hours, the number of culturable *E. coli* decreased from $1\times10^7$ to about $4\times10^4$ CFU/mL, equating to a 99.6% reduction.

Biofilm Development Experiments.

Figure 20:
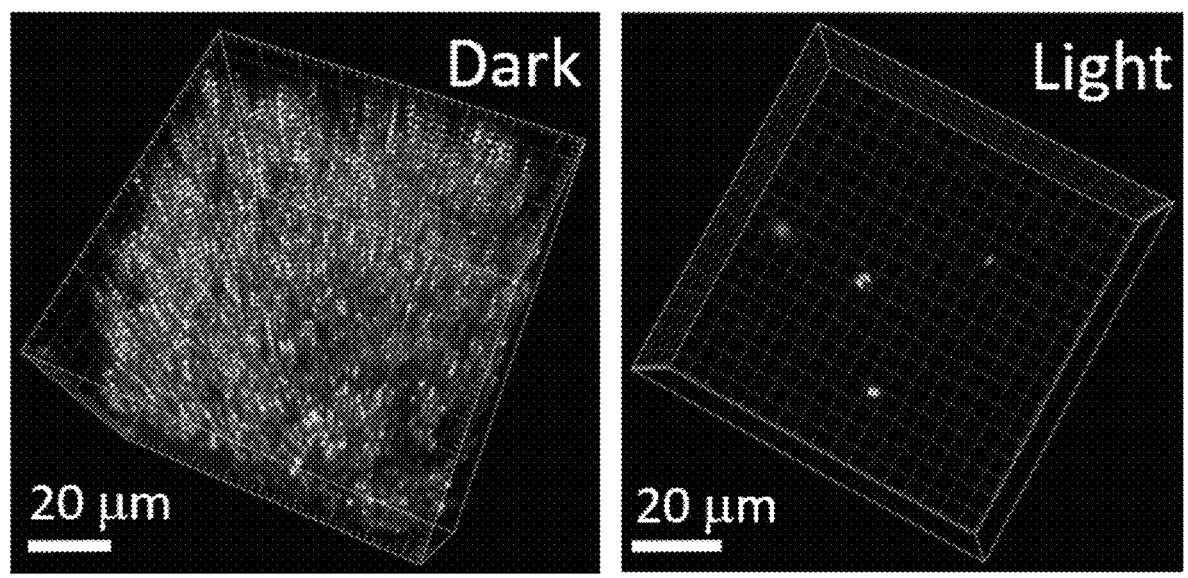
FIG. 20 shows confocal laser scanning microscopic images of S. epidermidis biofilms developed on the surface of $g-C_3N_4$ coupons in the dark (left) and under visible light (right) in accordance with various embodiments of the present disclosure.

*S. epidermidis* was cultured in tryptic soy broth (TSB) at 37° C. with mixing (120 rpm). *S. epidermidis* was harvested during its late-exponential phase by centrifugation and diluted in the PBS buffer to prepare a bacterial suspension ($OD_{600}$=0.5). $MCB_{0.07}$ g-$C_3N_4$ powder was then hydraulically pressed to form thin coupons. The $MCB_{0.07}$ g-$C_3N_4$ coupons were placed into a sterile six-well plate, and completely submerged by the bacterial suspension (2 ml for each coupon in each well) to form a system. The system was first incubated at 37° C. for 24 h without light and mixing to ensure effective bacterial attachment on the $MCB_{0.07}$ g-$C_3N_4$ coupon surface. Then, the suspension was evacuated by aspiration, and the coupons were gently rinsed with PBS three times to remove loosely attached cells. Next, the coupons were transferred to a new sterile six-well plate, and 2 ml of 10-fold diluted TSB was added to submerge the coupons. The system was incubated at 37° C. with a mixing rate of 80 rpm under LED irradiation and in the dark (control experiment). TSB was replenished every 24 hours for the system and the system was incubated for 3 days. At the end of the experiments, the $MCB_{0.07}$ g-$C_3N_4$ coupons were taken out and gently rinsed with the PBS buffer three times. The Filmtracer LIVE/DEAD Biofilm Viability Kit was used to stain the biofilms on the coupons, and a confocal microscope was utilized to image the biofilms. The confocal microscopy results are shown in FIG. 20. A thick biofilm with a majority of live cells was developed on the g-$C_3N_4$ coupon in the dark, however, negligible bacteria survived on the g-$C_3N_4$ under LED irradiation.

Optical Coherence Tomography (OCT) Analysis.

Figure 21:
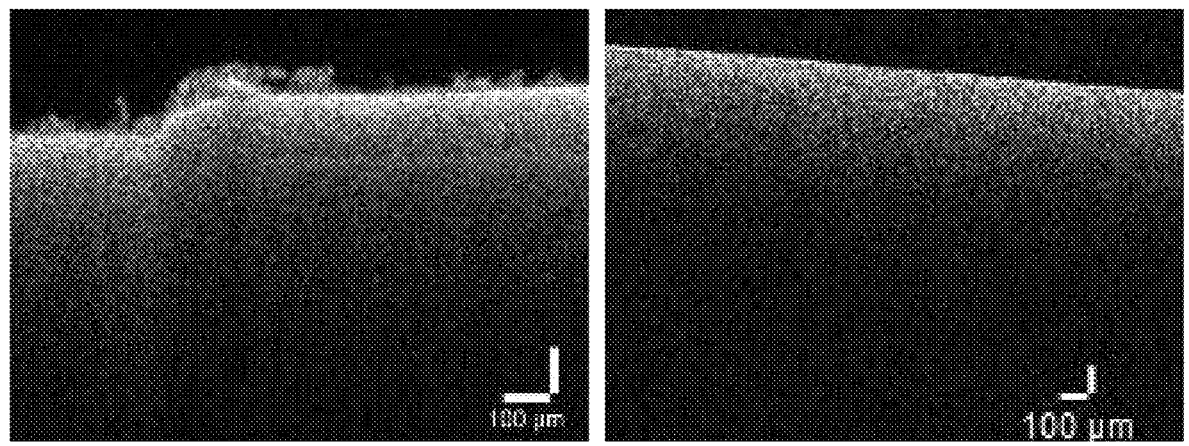
FIG. 21 shows optical coherence tomographic (OCT) images of S. epidermidis biofilms developed on the surface of $g-C_3N_4$ coupons in the dark (left) and under visible light (right) in accordance with various embodiments of the present disclosure.

*S. epidermidis* was cultured in tryptic soy broth (TSB) at 37° C. with mixing (120 rpm). *S. epidermidis* was then harvested during its late-exponential phase by centrifugation and diluted in the PBS buffer to prepare a bacterial suspension ($OD_{600}$=0.5). $MCB_{0.07}$ g-$C_3N_4$ powder was then hydraulically pressed to form thin coupons. The $MCB_{0.07}$ g-$C_3N_4$ coupons were placed into a sterile six-well plate, and completely submerged by the bacterial suspension (2 ml for each coupon in each well) to form a system. The system was first incubated at 37° C. for 24 h without light and mixing to ensure effective bacterial attachment on coupon surface. Then, the suspension was evacuated by aspiration, and the coupons were gently rinsed with PBS three times to remove loosely attached cells. Next, the coupons were transferred to a new sterile six-well plate, and 2 ml of 10-fold diluted TSB was added to submerge the coupons. The system was incubated at 37° C. with a mixing rate of 80 rpm under LED irradiation and in the dark (control experiment). TSB was replenished every 24 hours for the system and the system was incubated for 2 days. The coupons were analyzed by optical coherence tomography (OCT) in the six-well plates directly. FIG. 21 shows OCT images of biofilms developed on the surface of $MCB_{0.07}$ g-$C_3N_4$ coupons in the dark (left) and under visible light (right). A biofilm with a thickness of 50-100 µm were developed on the g-$C_3N_4$ coupon in the dark, however, no biofilm was observed on the $MCB_{0.07}$ g-$C_3N_4$ under LED irradiation.

Characterization of g-$C_3N_4$ Compositions

Figure 22:
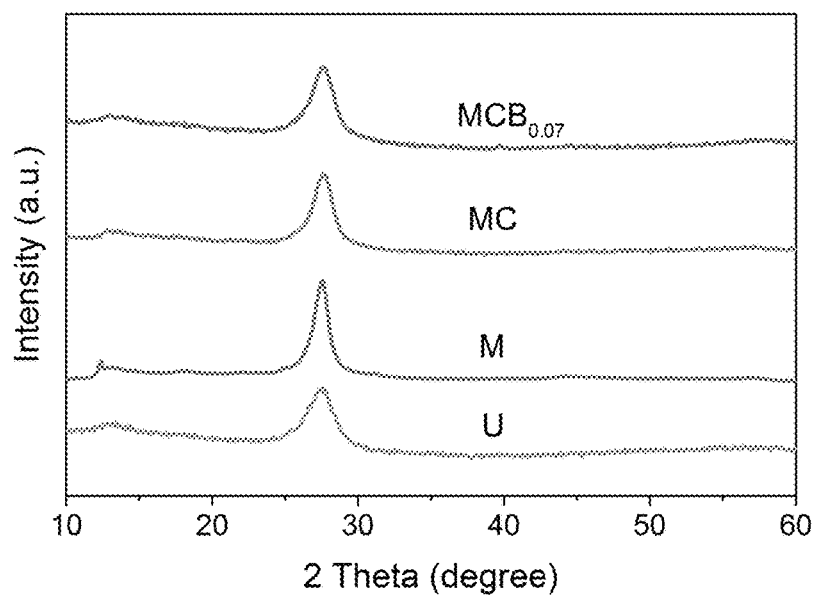
FIG. 22 shows powder X-ray diffraction (XRD) patterns of different $g-C_3N_4$ compositions (U, M, MC, and $MCB_{0.07}$; a.u. represents arbitrary units) in accordance with various embodiments of the present disclosure.

FIG. 22 is a graphical representation of the XRD patterns of g-$C_3N_4$ compositions formed from urea (U), melamine (M), melamine and cyanuric acid (MC), and melamine, cyanuric acid, and barbituric acid ($MCB_{0.07}$), respectively. As can be seen, all g-$C_3N_4$ samples had a similar XRD pattern that could be ascribed to a typical graphite-like structure and the introduction of cyanuric acid and/or barbituric acid may promote polymer-like growth and more defects in g-$C_3N_4$. Specifically, the peak 13° corresponding to in-plane ordering of tri-s-triazine units is less pronounced for supramolecule-based g-$C_3N_4$ (that is, MC and $MCB_{0.07}$) than M, indicating that more defects may be generated in the growth of g-$C_3N_4$ with the addition of cyanuric acid and/or barbituric acid. The other peak around 27.6°, representative of (002) interlayer stacking, became broader for supramolecule-based g-$C_3N_4$ and U, suggesting their crystallinities are lower than that of M. The results may indicate that polymer-like growth was dominated in U, MC, and $MCB_{0.07}$ compared to the growth of a graphitic structure in M.

Figure 23:
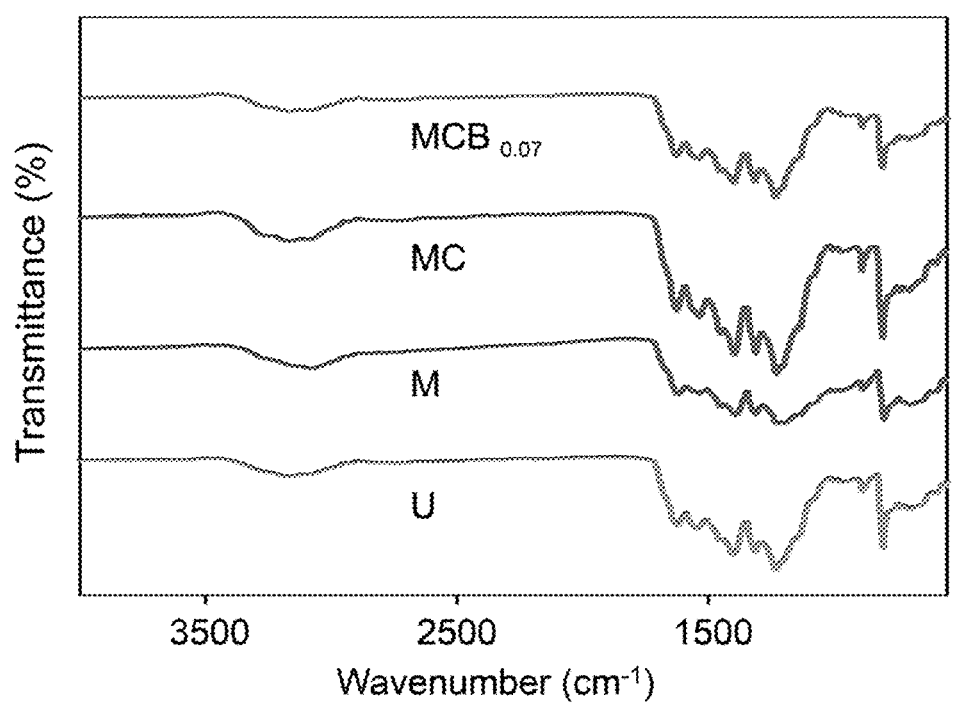
FIG. 23 shows ATR-FTIR spectra of different $g-C_3N_4$ compositions (U, M, MC, and $MCB_{0.07}$) in accordance with various embodiments of the present disclosure.

ATR-FTIR analysis of each photocatalyst (FIG. 23) showed absorption bands characteristic of g-$C_3N_4$: six bands in the 1200-1650 $cm^{-1}$ region for stretching modes of C—N heterocycles and one band at 805 $cm^{-1}$ for triazine.

Figure 24:
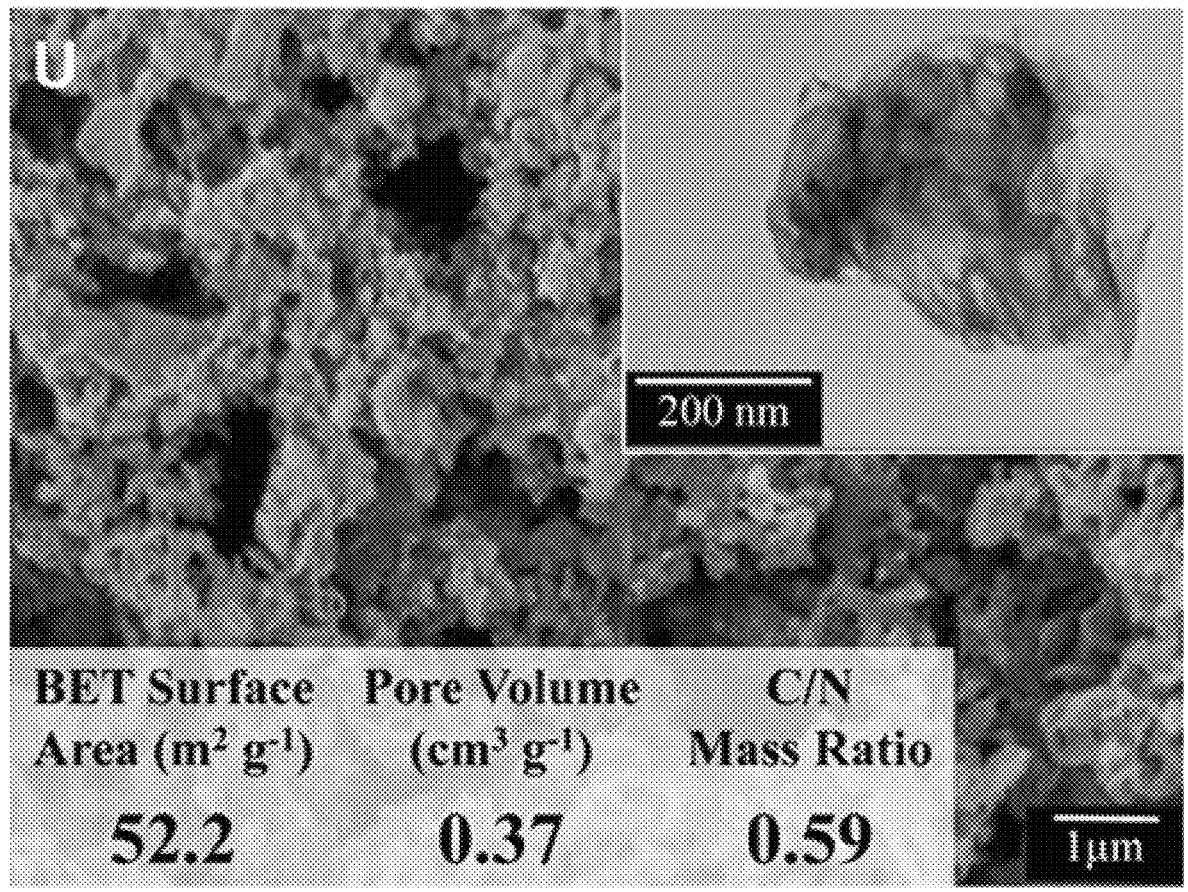
FIG. 24 shows an SEM image and a transmission electron microscopic (TEM) image (inset) of a $g-C_3N_4$ composition formed from urea (U), and further shows a table (inset) providing the surface area, pore volume, and bulk carbon to nitrogen (C/N) mass ratio of U in accordance with various embodiments of the present disclosure.
Figure 26:
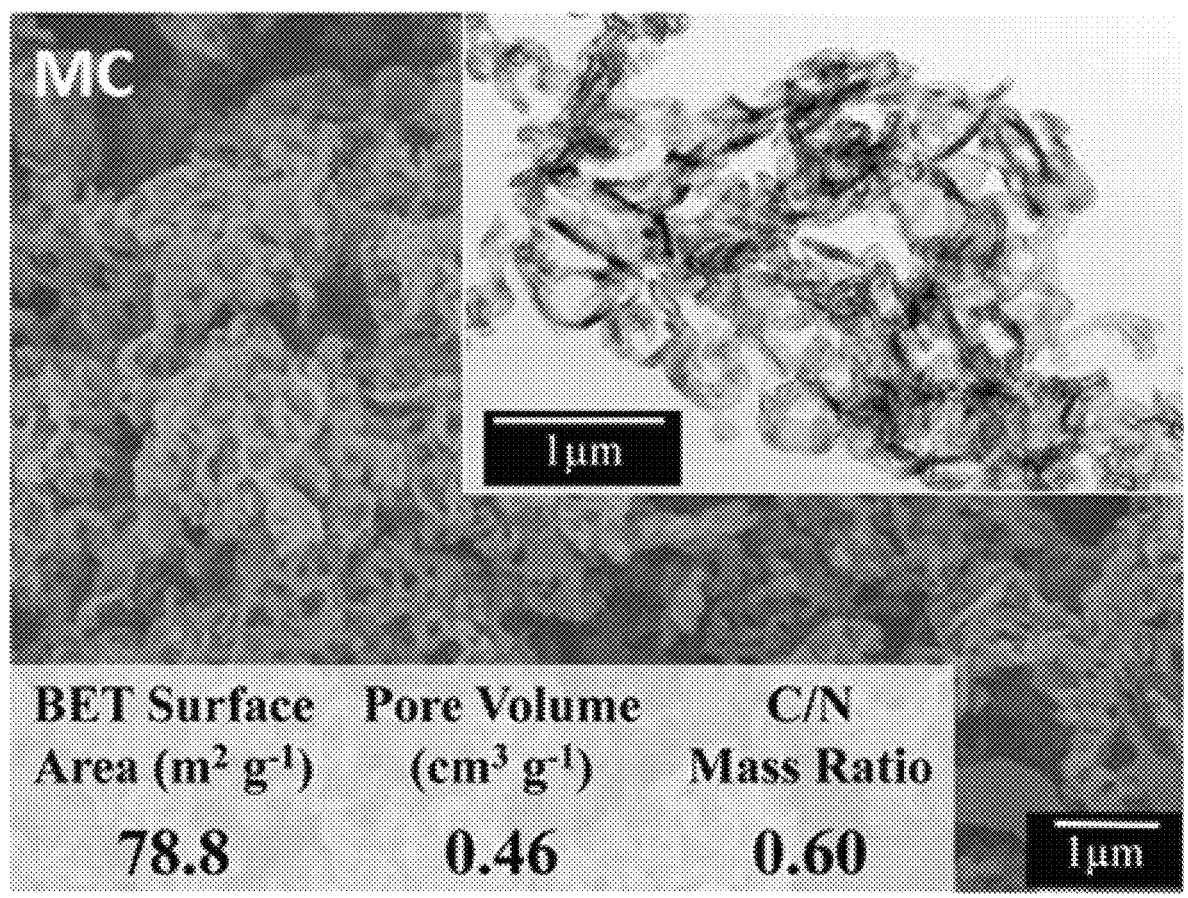
FIG. 26 shows an SEM image and a TEM image (inset) of a $g-C_3N_4$ composition formed from melamine and cyanuric acid (MC), and further shows a table (inset) providing the surface area, pore volume, and bulk carbon to nitrogen (C/N) mass ratio of MC in accordance with various embodiments of the present disclosure.

FIG. 24 is an SEM image and a TEM image (inset) of a g-$C_3N_4$ composition formed from urea (U). FIG. 26 further provides a table (inset) providing the surface area, pore volume, and bulk carbon to nitrogen (C/N) mass ratio of the U composition. The g-$C_3N_4$ composition formed from urea has a porous structure, possibly due to a large amount of gas production in the thermal polycondensation of urea (e.g., $NH_3$ and $H_2O$).

Figure 25:
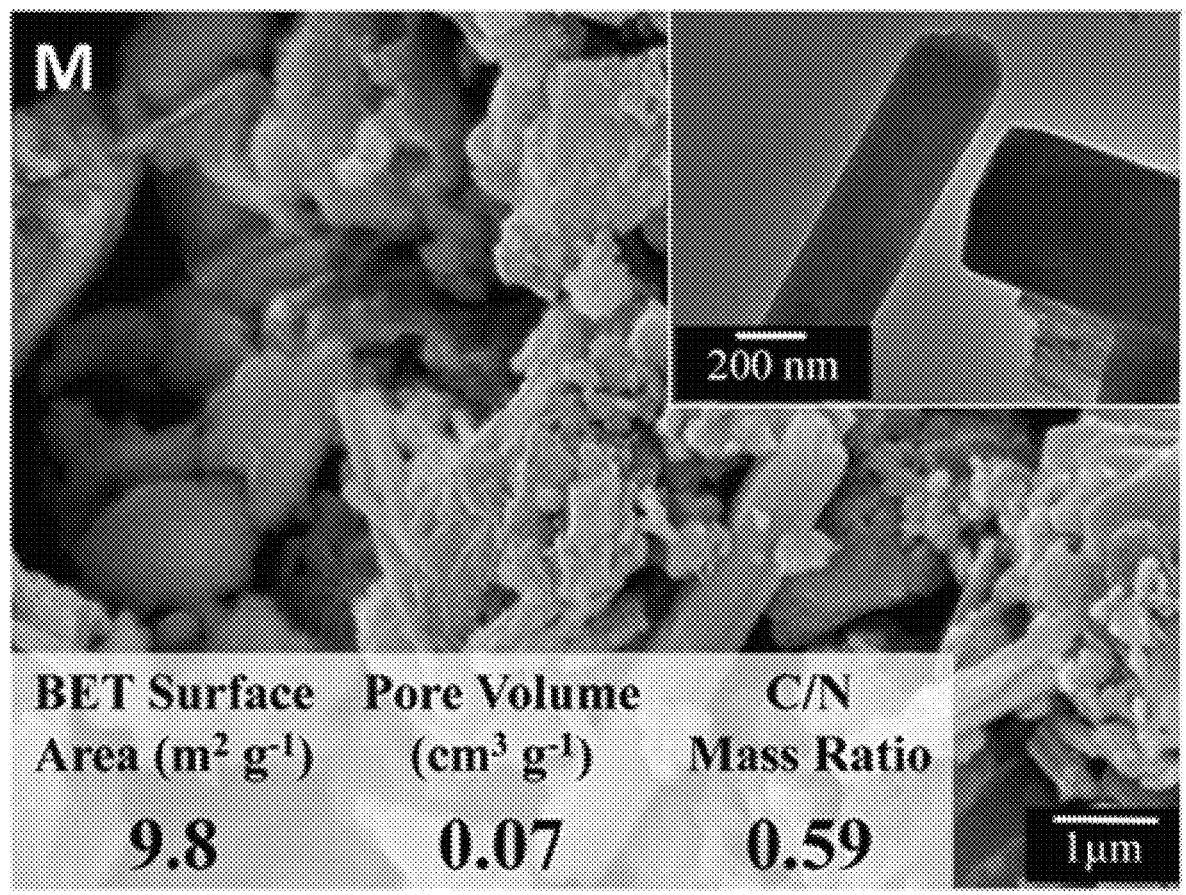
FIG. 25 shows an SEM image and a TEM image (inset) of a $g-C_3N_4$ composition formed from melamine (M), and further shows a table (inset) providing the surface area, pore volume, and bulk carbon to nitrogen (C/N) mass ratio of M in accordance with various embodiments of the present disclosure.
Figure 27:
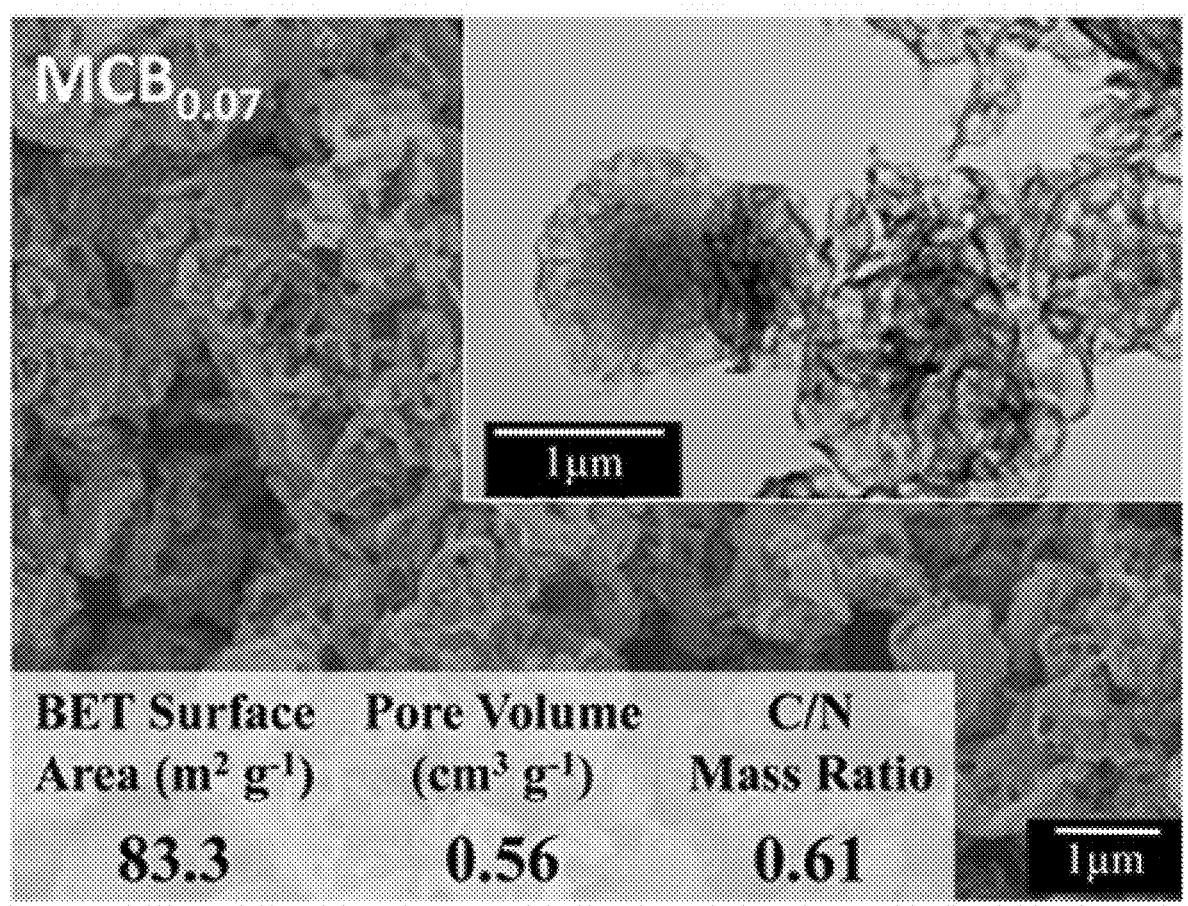
FIG. 27 shows an SEM image and a TEM image (inset) of a $g-C_3N_4$ composition formed from melamine, cyanuric acid, and barbituric acid ($MCB_{0.07}$), and further shows a table (inset) providing the surface area, pore volume, and bulk carbon to nitrogen (C/N) mass ratio of $MCB_{0.07}$ in accordance with various embodiments of the present disclosure.

FIG. 25 is an SEM image and a TEM image (inset) of a g-$C_3N_4$ composition formed from melamine (M). FIG. 27 further provides a table (inset) providing the surface area, pore volume, and bulk carbon to nitrogen (C/N) mass ratio of the M composition. A typical condensed, layered structure of the g-$C_3N_4$ composition formed from melamine was observed with the presence of fewer pores than when formed from urea, likely due to a lesser extent of structural reorganization and reduced gas emission.

Figure 28:
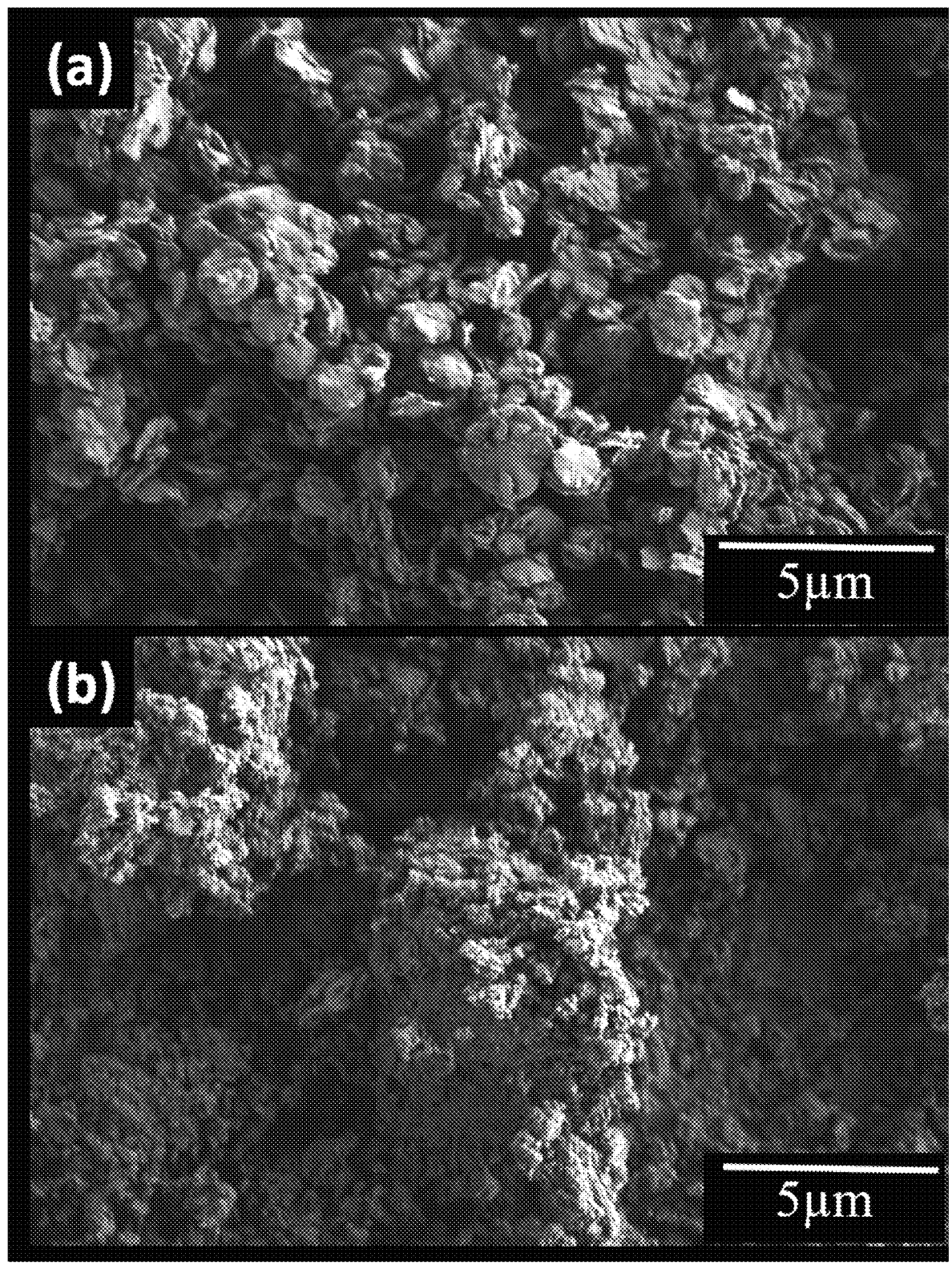
FIG. 28 shows SEM images of $MCB_{0.07}$ prepared in ethanol (a) and water (b) in accordance with various embodiments of the present disclosure.

FIG. 26 is an SEM image and a TEM image (inset) of a g-$C_3N_4$ composition formed from melamine and cyanuric acid (MC). FIG. 28 further provides a table (inset) providing the surface area, pore volume, and bulk carbon to nitrogen (C/N) mass ratio of the MC composition. The addition of cyanuric acid created a loose, porous structure, as expected from the self-templating of cyanuric acid with limited thermal stability.

Figure 29:
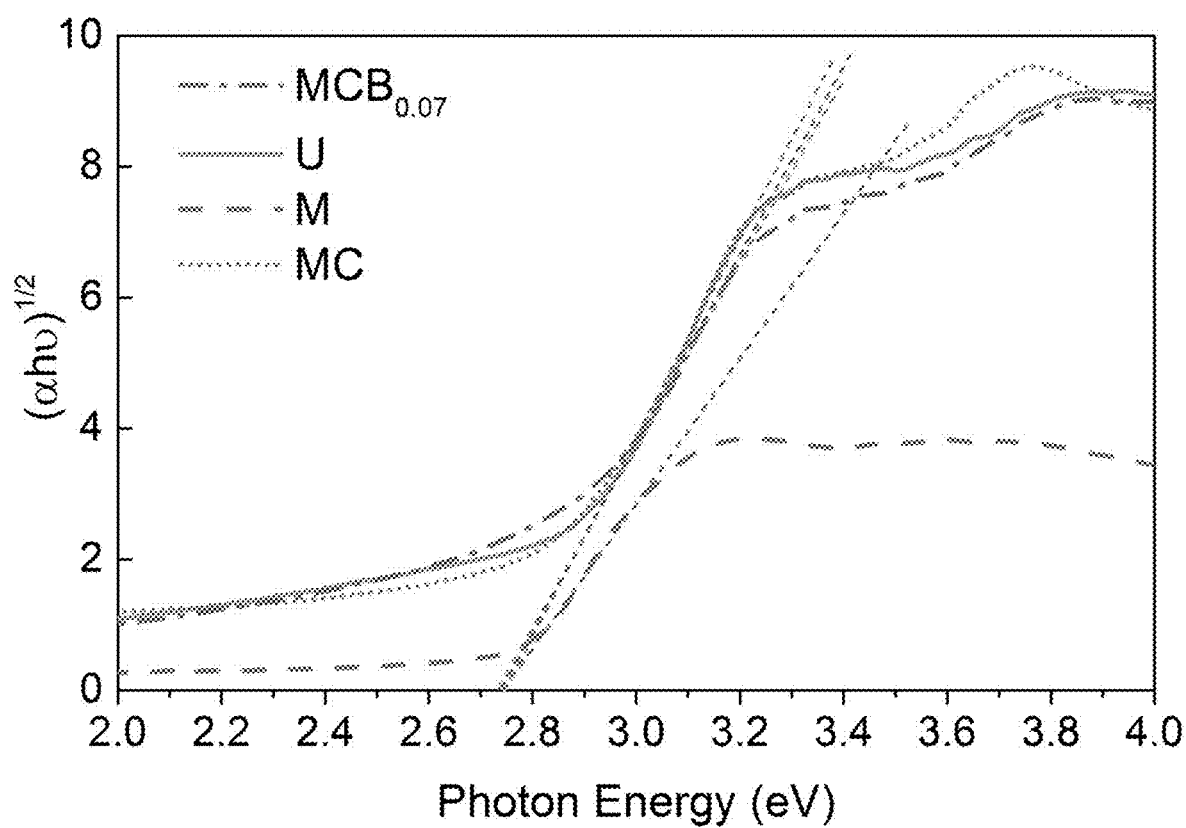
FIG. 29 is a graphical display of band gap properties of different $g-C_3N_4$ compositions in accordance with various embodiments of the present disclosure.

FIG. 27 is an SEM image and a TEM image (inset) of a g-$C_3N_4$ composition formed from melamine, cyanuric acid and barbituric acid ($MCB_{0.07}$). FIG. 29 further provides a table (inset) providing the surface area, pore volume, and bulk carbon to nitrogen (C/N) mass ratio of the $MCB_{0.07}$ composition. The addition of cyanuric acid created a loose, porous structure, as expected from the self-templating of cyanuric acid with limited thermal stability. Further introduction of barbituric acid for $MCB_{0.07}$ synthesis did not lead to any notable change in the sample morphology, possibly because of the low loading of barbituric acid (i.e., 0.07 g).

The surface area and porosity of g-$C_3N_4$ samples were characterized by liquid $N_2$ adsorption, and the adsorption isotherms and pore size distribution indicated that U, MC, and $MCB_{0.07}$ compositions mainly contained mesopores. The M composition had the lowest BET surface area and pore volume in all g-$C_3N_4$ samples, as supported by the SEM and TEM results. The BET surface area and pore volume of the MC composition increased by 8.0- and 6.6-fold compared to those of the M composition and were also higher than those of the U composition. The $MCB_{0.07}$ had the highest surface area and pore volume compared to other compositions. Also, the C/N mass ratio increases from 0.59 (U and M compositions) to 0.60 (the MC composition) to 0.61 (the $MCB_{0.07}$ composition).

FIG. 28 shows SEM images of $MCB_{0.07}$ prepared in ethanol (a) and water (b). As shown, preparation in ethanol leads to $MCB_{0.07}$ having a pancake-like structure while preparation in water leads to $MCB_{0.07}$ having an irregular rod-/particle-like structure.

Figure 30:
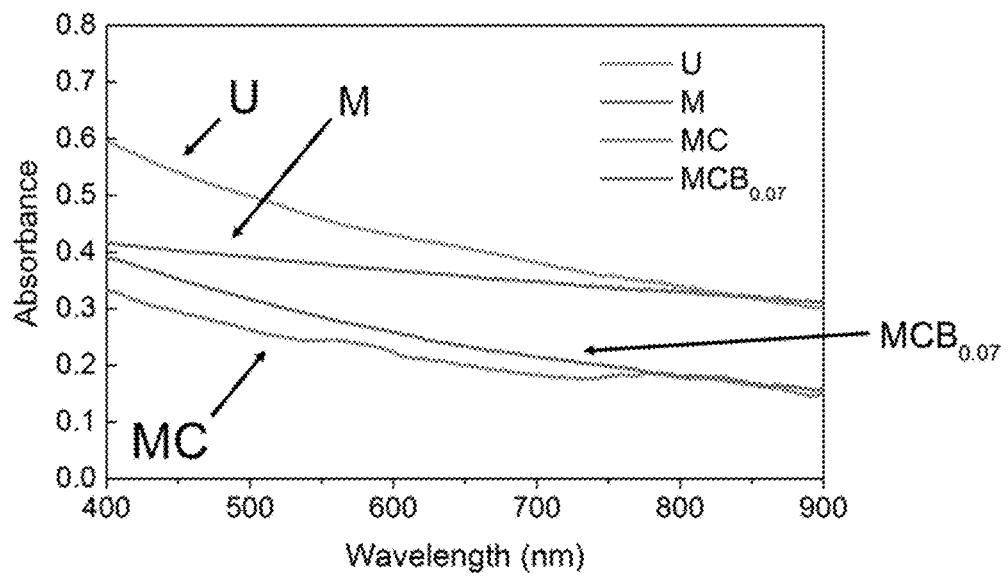
FIG. 30 is a graphical display of optical absorbance of different $g-C_3N_4$ composition suspensions (1 g/L of U, M, MC, and $MCB_{0.07}$ in 1 mM phosphate buffer, pH 7.3) in accordance with various embodiments of the present disclosure.

Optical properties of the g-$C_3N_4$ compositions, including band gap and optical absorption, were characterized to evaluate its capability of harvesting and utilizing visible photons. g-$C_3N_4$ is an indirect band gap photocatalyst, and all g-$C_3N_4$ compositions had a similar band gap of 2.72 eV (harvesting photons with λ≤ca. 460 nm, FIG. 29), which is in agreement with the presently disclosed DFT simulation results for undoped g-$C_3N_4$. The addition of cyanuric acid and barbituric acid did not change the band gap of g-$C_3N_4$, in contrast to DFT predictions, likely due to the low dopant level (C/N mass ratio of 0.61 vs 0.59). Nevertheless, the $MCB_{0.07}$ composition showed noticeable band-tail absorption in the visible light region (>460 nm) compared to undoped g-$C_3N_4$ compositions (U, M, and MC in FIG. 29), likely due to the presence of midgap states, i.e., the electronic states located within the band gap. The midgap states can accommodate photoexcited electrons from the valence band, resulting in the absorption of photons with energies smaller than the band gap for photocatalytic reactions. In addition to intrinsic photon absorption as reflected by the band gap, the morphology, structure, and particle size of g-$C_3N_4$ in reaction suspension can also impact the photon absorption due to light reflection and scattering on materials. The U composition had the highest absorption of visible light (λ>400 nm), followed by the other samples (i.e., M, MC, and $MCB_{0.07}$ compositions) with similar optical absorption, as illustrated in FIG. 30. Increased photon absorption of the U composition may improve the photocatalytic activity for contaminant degradation.

Figure 31:
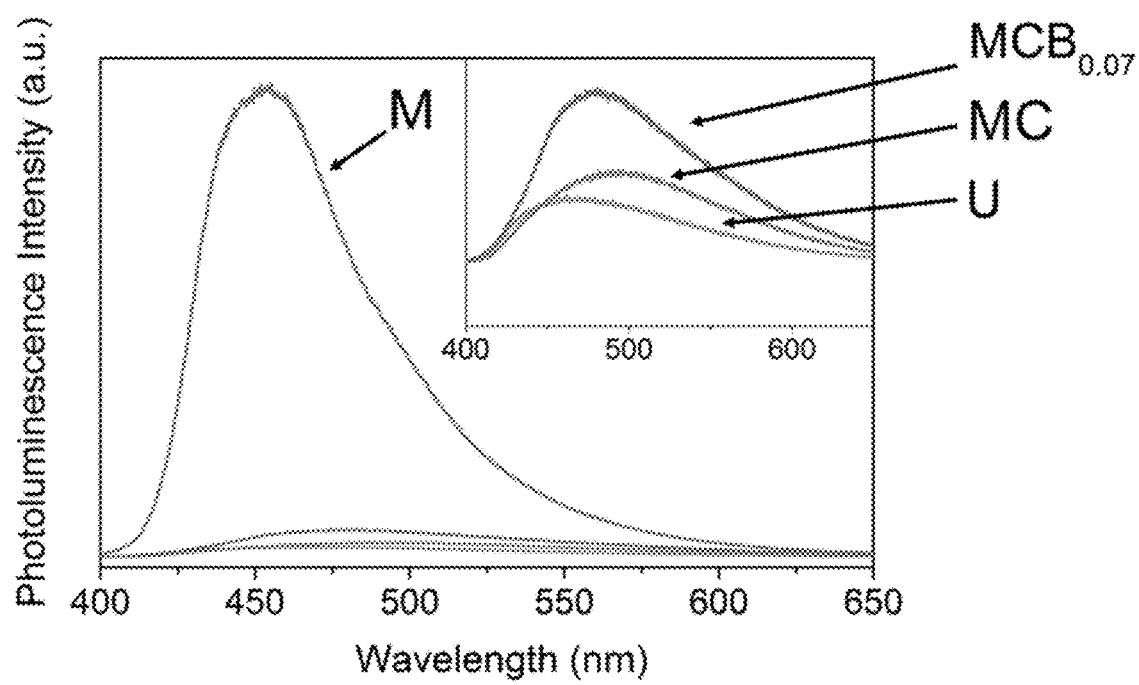
FIG. 31 is a graphical display of photoluminescence spectra of different $g-C_3N_4$ compositions (U, M, MC, and $MCB_{0.07}$; a.u. represents arbitrary units) in accordance with various embodiments of the present disclosure.

Improved charge separation may enhance the photocatalytic activity of g-$C_3N_4$ because of an increased amount of charge carriers for photocatalytic reactions. PL intensity, representative of radiative charge recombination, was used as an indirect evidence to characterize charge separation. The PL intensity of U, MC, and $MCB_{0.07}$ was similar and significantly lower than that of M (FIG. 31), and it suggests that charge recombination may be the most pronounced in M, and its photocatalytic performance may be limited. The PL peak of U, MC, and $MCB_{0.07}$ also red-shifted compared to that of M (FIG. 31). The reduction of PL intensity and red-shifted peaks indicate that the addition of cyanuric acid and barbituric acid for the preparation of supramolecule-based g-$C_3N_4$ may lower the charge recombination compared to M derived from melamine only. Holes are generally less mobile than electrons (i.e., diffusion length of several nanometers vs micrometers), and increased surface area and porosity in U, MC, and $MCB_{0.07}$ could facilitate the migration of holes to the surface and subsequent reactions with contaminants rather than recombination with electrons. Carbon dopants may also facilitate hole localization and improve the reaction between charge carriers and contaminants, as suggested by DFT simulations. Nevertheless, the PL only qualitatively characterizes the extent of radiative charge recombination but not nonradiative charge recombination (dissipation as heat rather than photon emission), and it may not necessarily explain the photocatalytic activity. For example, the PL intensity of U and MC was lower compared to that of $MCB_{0.07}$, which suggested that U and MC might exhibit an increased charge separation. In contrast, the photocatalytic activity of $MCB_{0.07}$ was equal to or higher than that of U and MC for contaminant degradation.

It will be apparent that various other modifications and adaptations of the embodiments or application will be apparent to the person skilled in the art after reading the foregoing disclosure without departing from the scope of the application and it is intended that all such modifications and adaptations come within the scope of the appended claims.

What is claimed is:

1. A method of forming a supramolecule-based, carbon-doped graphitic carbon nitride (g-$C_3N_4$) composition, the method comprising:
   forming a suspension comprising an organic solvent and a precursor mixture comprising melamine, cyanuric acid, and barbituric acid;
   drying the suspension at a first temperature to remove the organic solvent and form a supramolecular complex;
   heating the supramolecular complex at a second temperature to form a carbon-doped g-$C_3N_4$ composition.

2. The method of claim 1, wherein the precursor mixture comprises about 50 wt % melamine, about 2.5-49.75 wt % cyanuric acid, and about 0.25-47.5 wt % barbituric acid.

3. The method of claim 1, wherein the precursor mixture comprises about 50 wt % melamine, about 47.5-49.75 wt % cyanuric acid, and about 0.25-2.5 wt % barbituric acid.

4. The method of claim 1, wherein the second temperature is between about 450° C. and about 600° C.

5. An article having a surface coated with a carbon-doped g-$C_3N_4$ composition formed according to claim 1.

6. The article of claim 5, the article being any one of a kitchen counter-top, a cutting board, a hand-gripping portion of an appliance, a hand-gripping portion of a cabinet, a hand-gripping portion of a drawer, a desk, a table, a light fixture, a light switch, a food package, and a food processing surface.

7. A water treatment system comprising a carbon-doped g-$C_3N_4$ composition formed according to claim 1.

8. The water treatment system of claim 7, wherein the carbon-doped g-$C_3N_4$ composition photocatalytically degrades persistent organic micropollutants comprising pharmaceuticals and personal care products (PPCPs), endocrine disrupting compounds (EDCs), pesticides, and herbicides in the presence of ultraviolet (UV) or visible light.

9. The method of claim 1, wherein the organic solvent is selected from the group consisting of chlorinated solvents, ethers, aldehydes and ketones.

10. The method of claim 1, wherein the organic solvent is an alcohol.

11. The method of claim 10, wherein the alcohol is ethanol.

* * * * *